US010132442B2

United States Patent
Balch et al.

(10) Patent No.: US 10,132,442 B2
(45) Date of Patent: Nov. 20, 2018

(54) CONSTANT FRICTION ROTATING MONITOR STAND

(71) Applicant: Creston Electronics, Inc., Rockleigh, NJ (US)

(72) Inventors: Howard Balch, Bloomingdale, NJ (US); Fred Bargetzi, Upper Saddle River, NJ (US); Wendy Feldstein, Old Tappan, NJ (US); Dhirendra Patel, Edison, NJ (US); Dan Previti, Tarrytown, NY (US); William Rahek, Oradell, NJ (US); George Feldstein, Cresskill, NJ (US)

(73) Assignee: CRESTRON ELECTRONICS, INC., Rockleigh, NJ (US)

( * ) Notice: Subject to any disclaimer, the term of this patent is extended or adjusted under 35 U.S.C. 154(b) by 0 days.

(21) Appl. No.: 14/802,676

(22) Filed: Jul. 17, 2015

(65) Prior Publication Data
US 2017/0016569 A1     Jan. 19, 2017

(51) Int. Cl.
*F16M 11/10* (2006.01)
*F16M 11/22* (2006.01)
*F16B 1/00* (2006.01)

(52) U.S. Cl.
CPC ...... *F16M 11/10* (2013.01); *F16B 2001/0021* (2013.01); *F16M 11/22* (2013.01); *F16M 2200/041* (2013.01); *F16M 2200/08* (2013.01)

(58) Field of Classification Search
CPC .................................................. F16M 11/10
(Continued)

(56) References Cited

U.S. PATENT DOCUMENTS

| | | | | |
|---|---|---|---|---|
| 4,251,850 A | * | 2/1981 | Kalbitz | A61B 6/4476 312/209 |
| 4,533,105 A | * | 8/1985 | Cornwell, Jr. | F16M 11/10 248/183.2 |

(Continued)

*Primary Examiner* — Terrell L McKinnon
*Assistant Examiner* — Michael McDuffie
(74) *Attorney, Agent, or Firm* — Crestron Electronics, Inc

(57) ABSTRACT

A monitor stand for use in holding and maintaining a position of a monitor comprising a carrier adapted to removably and fixedly hold a monitor, the carrier including first and second trapezoidal shaped cubic mounting protrusions on a bottommost portion of the carrier, and wherein the carrier is further adapted to rotate between a first angular placement and a second angular placement, a base enclosure adapted to provide a substantially stable platform to hold the monitor in an upright condition and to provide a frictional engagement against which the carrier can rotate, the base enclosure including first and second base enclosure channels, a low friction insert adapted to be inserted between the carrier and the base enclosure and which is part of the frictional engagement of the base enclosure, the low friction insert including a first and second channel insertion portions adapted to fit into the first and second base enclosure channels respectively, and wherein the first and second trapezoidal shaped cubic mounting protrusions of the carrier fit into the first and second channel insertion portions, respectively, and first and second spring retention assemblies, each of which is adapted to provide a substantially constant rotational spring force against a direction of movement of the monitor due to gravity, and which are affixed to the first and second protrusions respectively.

26 Claims, 28 Drawing Sheets

(58) Field of Classification Search
USPC .... 248/371, 372.1, 398, 917, 918, 919, 922,
248/923, 125.2, 123.11, 123.2, 133, 139,
248/143; 361/679.01, 679.02, 679.21,
361/679.22
See application file for complete search history.

(56) References Cited

U.S. PATENT DOCUMENTS

| | | | | |
|---|---|---|---|---|
| 4,621,782 A * | 11/1986 | Carlson | ............. | F16M 11/10 248/183.3 |
| 5,145,134 A * | 9/1992 | Hashimoto | ......... | F16M 11/126 248/181.1 |
| 5,257,164 A * | 10/1993 | Perez | ............. | F16M 11/10 361/679.22 |
| 5,881,985 A * | 3/1999 | Hoenig | ............. | F16M 11/10 248/371 |
| 6,007,038 A * | 12/1999 | Han | ............. | F16M 11/10 248/346.06 |
| 6,024,336 A * | 2/2000 | Lin | ............. | F16M 11/126 248/371 |
| 6,089,520 A * | 7/2000 | Wu | ............. | F16M 11/126 248/371 |
| 6,359,772 B1 * | 3/2002 | Kim | ............. | F16M 11/10 248/917 |
| 2003/0132360 A1 * | 7/2003 | Ju | ............. | F16M 11/10 248/371 |
| 2003/0174259 A1 * | 9/2003 | Yang | ............. | F16M 11/041 349/58 |
| 2005/0270732 A1 * | 12/2005 | Titzler | ............. | G06F 1/1601 361/679.22 |
| 2007/0096001 A1 * | 5/2007 | Lee | ............. | F16M 11/046 248/371 |
| 2007/0103856 A1 * | 5/2007 | She | ............. | G06F 1/1601 361/679.22 |
| 2011/0174952 A1 * | 7/2011 | Huang | ............. | F16M 11/041 248/371 |
| 2011/0260028 A1 * | 10/2011 | Atallah | ............. | F16M 11/04 248/371 |

* cited by examiner

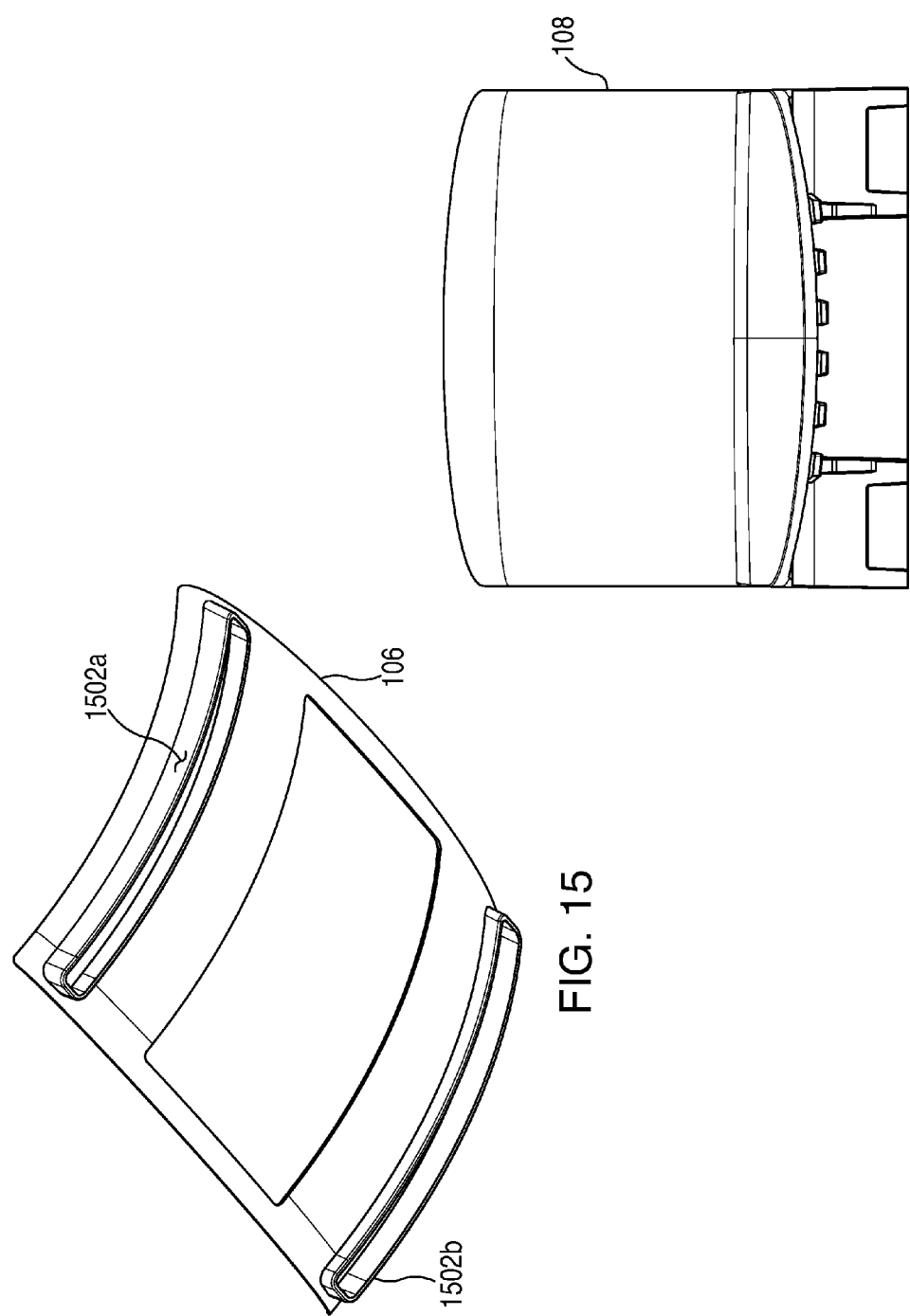

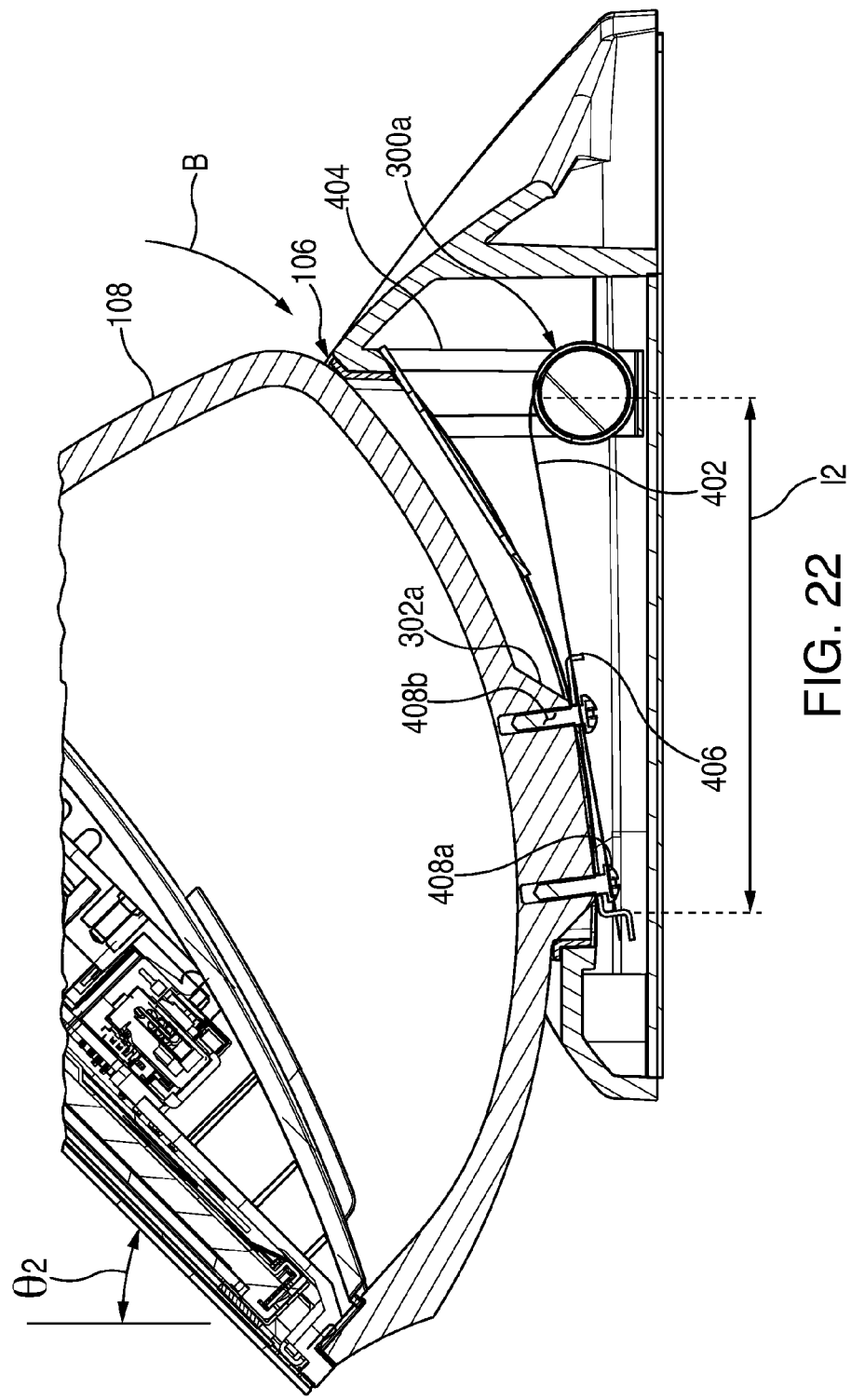

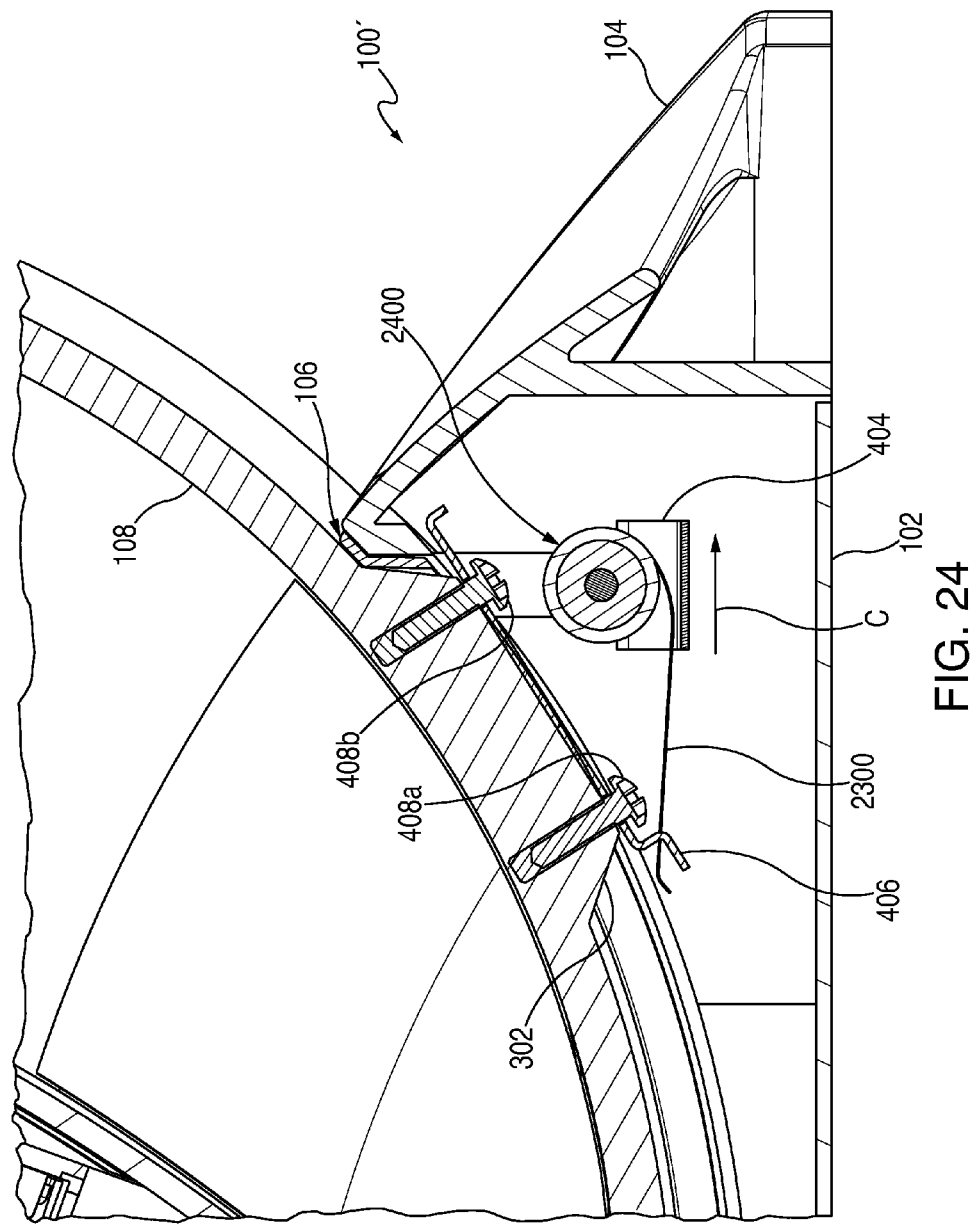

CONSTANT FRICTION ROTATING MONITOR STAND

BACKGROUND OF THE INVENTION

Technical Field

Aspects of the embodiments relate to monitor stands that can rotate and hold in position a monitor for use as a stand-alone monitor (or display), or for use with a computer (such as, but not limited to a personal computer), or for use with an integrated automation system that includes centralized control for controlling numerous devices such as motorized shades, curtains, heating ventilation and air conditioning systems, security systems, lighting systems, audio-video devices and systems, among others, in either or both of a residential home and commercial enterprise.

Background Art

The use of monitors is virtually ubiquitous in today's computer/electronics driven society. Even though laptops and tablets are becoming increasingly more commonplace, standalone monitors are still very much used. In some cases, the standalone monitors are attached to computer and peripherals through cabling, and in some cases, the computer is integrated into the monitor (commonly referred to as "all-in-one's"). While strictly not a standalone monitor, in form and function, all-in-one computers are virtually identical to the standalone monitor that only houses the electronics and other circuitry dedicated to receiving, processing and displaying of video signals.

Because the use of monitors, whether in the integrated or standalone form, is so prevalent, their use needs to be as convenient and efficient as possible. One aspect of convenience and efficiency is that the monitor be readily and easily adjustable according to the preference of the user. Accordingly, a need has arisen for a monitor that can be tilted to a specific angle, within a range of angles, and which does not move until specifically moved by a user.

SUMMARY OF THE INVENTION

An object of the embodiments is to substantially solve at least the problems and/or disadvantages discussed above, and to provide at least one or more of the advantages described below.

It is therefore a general aspect of the embodiments to provide a monitor stand that can rotate and hold in position a monitor for use as a stand-alone monitor (or display), or for use with a computer (such as, but not limited to a personal computer), or for use with an integrated automation system that includes centralized control for controlling numerous devices such as motorized shades, curtains, heating ventilation and air conditioning systems, security systems, lighting systems, audio-video devices and systems, among others, in either or both of a residential home and commercial enterprise.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

Disclosure of Invention

According to a first aspect of the embodiments, a monitor stand for use in holding and maintaining a position of a monitor is provided comprising: a carrier adapted to removably and fixedly hold a monitor, the carrier including first and second trapezoidal shaped cubic protrusions on a bottommost portion of the carrier, and wherein the carrier is further adapted to rotate between a first angular placement and a second angular placement; a base enclosure adapted to provide a substantially stable platform to hold the monitor in an upright condition, the base enclosure including first and second base enclosure channels; a low friction insert adapted to be inserted between the carrier and the base enclosure and which is part of the frictional engagement of the base enclosure, the low friction insert including a first and second channel insertion portions adapted to fit into the first and second base enclosure channels respectively, and wherein the first and second trapezoidal shaped cubic protrusions of the carrier fit into the first and second channel insertion portions, respectively; and first and second spring retention assemblies, each of which is adapted to provide a substantially constant rotational spring force against a direction of movement of the monitor due to gravity, and which are affixed to the first and second protrusions respectively.

According to the first aspect of the embodiments, the first angular placement is about 20° from a vertical placement of the monitor, and the second angular placement is about 45° from a vertical placement of the monitor. According to the first aspect of the embodiments, the monitor is a display monitor and according to further aspects of the embodiments, the monitor is a personal computer all-in-one device. Still further according to the first aspect of the embodiments, the downward rotational movement is caused by user-induced movement, and/or gravity.

According to a second aspect of the embodiments, a monitor stand for use in holding and maintaining a position of a monitor is provided, comprising: one or more spring retention assemblies adapted to provide a substantially constant rotational spring force that counteracts downward rotational motion of the monitor within and with respect to the monitor stand, such that the monitor remains substantially fixed and motionless when rotated to a new position by a user.

According to the second aspects of the embodiments, the monitor stand further comprises: a base enclosure adapted to provide a substantially stable platform to hold the monitor in a variable upright condition and to provide a frictional engagement against which the carrier can rotate, the base enclosure including first and second base enclosure channels; a carrier adapted to removably and fixedly hold the monitor, the carrier including first and second trapezoidal shaped cubic mounting protrusions on a bottommost portion of the carrier, and wherein the carrier is further adapted to rotate between a first angular placement and a second angular placement with respect to the base enclosure; and a low friction insert adapted to be inserted between the carrier and the base enclosure and which is part of the frictional engagement of the base enclosure, the low friction insert including first and second channel insertion portions adapted to fit into the first and second base enclosure channels respectively, and wherein the first and second trapezoidal shaped cubic mounting protrusions of the carrier fit into the first and second channel insertion portions, respectively, and wherein the one or more spring retention assemblies are affixed to the first and second cubic mounting protrusions respectively.

According to the second aspect of the embodiments, each of the one or more spring retention assemblies comprises a spring assembly bracket affixed to the base enclosure, and a substantially constant force rotational spring affixed to the spring assembly bracket, extendible from a first distance, when the monitor is at minimum angular displacement with respect to a substantially perpendicular displacement, to a second distance, when the monitor is at a maximum angular displacement with respect to the substantially perpendicular displacement. According to the second aspect of the embodiments, the spring force generated by the rotational spring is substantially constant when the rotational spring is extended at and between the first and second distances.

According to the second aspect of the embodiments, the monitor stand further comprises a pressure plate affixed to the cubic mounting protrusion, the pressure plate including a first tab adapted to retain the rotational spring and secure the rotational spring to the carrier.

Still further according to the second aspect of the embodiments, the rotational spring comprises a hole at a first end of the rotational spring, the hole adapted to fit about the first tab and to retain the rotational spring to the pressure plate, and the low friction insert is adapted to generate a frictional interface force between itself and the carrier, such that the generated frictional interface force is added to the spring force of the spring retention assemblies to resist rotational motion of the monitor.

According to the second aspect of the embodiments, the generated frictional interface force is generated by a weight of the monitor and the frictional coefficient between a first material the carrier is made of, and a second material that the low friction insert is made of, and further wherein the first material is selected from the group consisting of aluminum and glass-filled polycarbonate, and the second material is selected from the group consisting of nylon, delrin, and Teflon.

According to the second aspect of the embodiments, the generated frictional interface force is generated at a plurality of corresponding surfaces areas of the low friction insert and the carrier, and wherein the plurality of corresponding surface areas comprises a plurality of exterior surface area parts of the first and second trapezoidal shaped cubic mounting protrusions, a plurality of exterior surface area parts of the first and second channel insertion portions, and a portion of a bottom surface area of the carrier that contacts a portion of an upper surface area of the low friction insert.

According to the second aspect of the embodiments, the first angular placement is about 20° from a vertical placement of the monitor, and the second angular placement is about 45° from a vertical placement of the monitor.

According to the second aspect of the embodiments, the monitor is a display monitor. According to the second aspect of the embodiments, the monitor is a personal computer all-in-one device. Still further according to the second aspect of the embodiments, the downward rotational movement is caused by user-induced movement, and/or gravity.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

Figure 1:
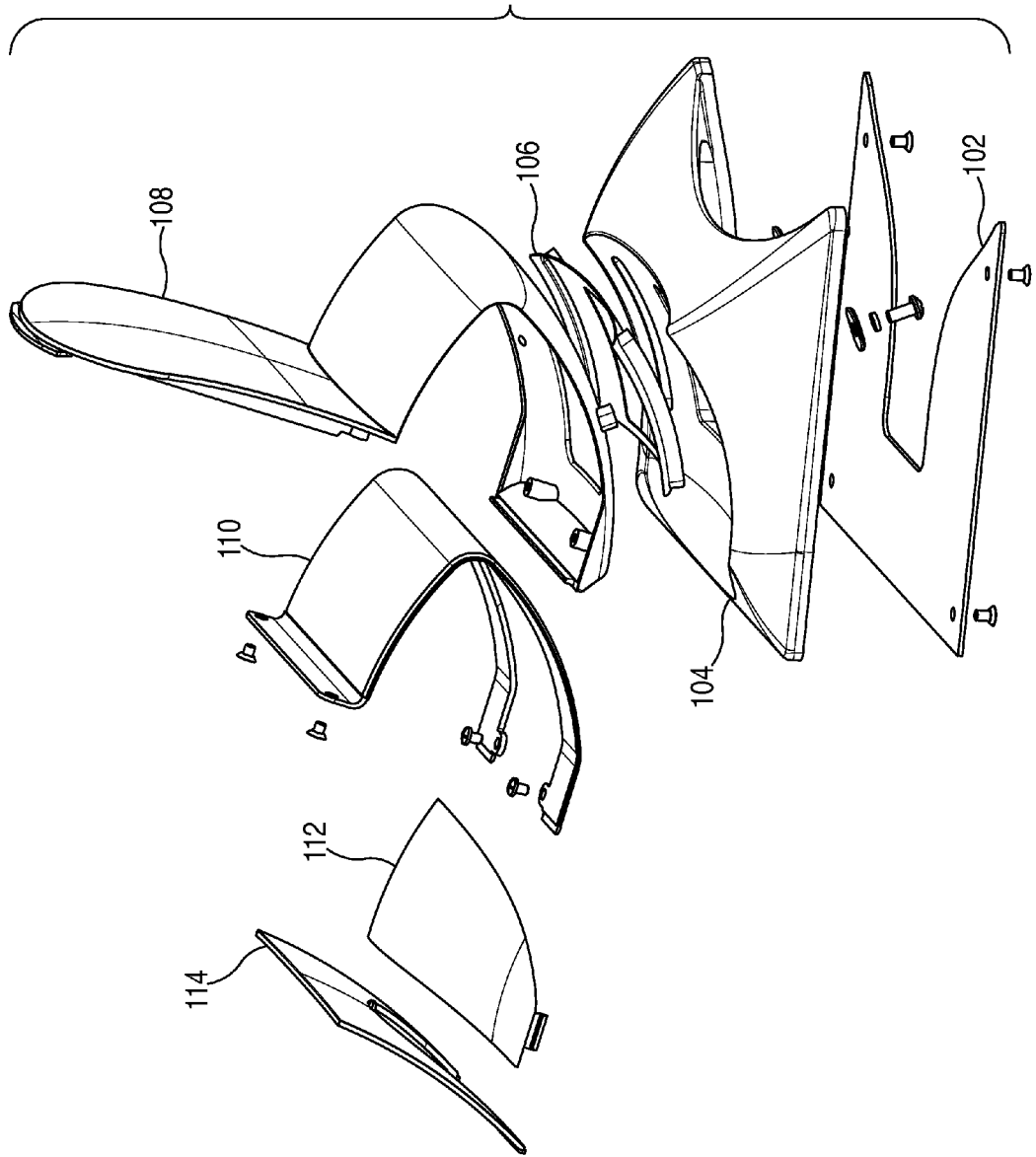

Brief Description of the Several Views of the Drawing

FIG. 1 illustrates an exploded view of a constant friction rotating monitor stand that comprises a first embodiment of a constant force spring retention assembly according to aspects of the embodiments.

Figure 2:
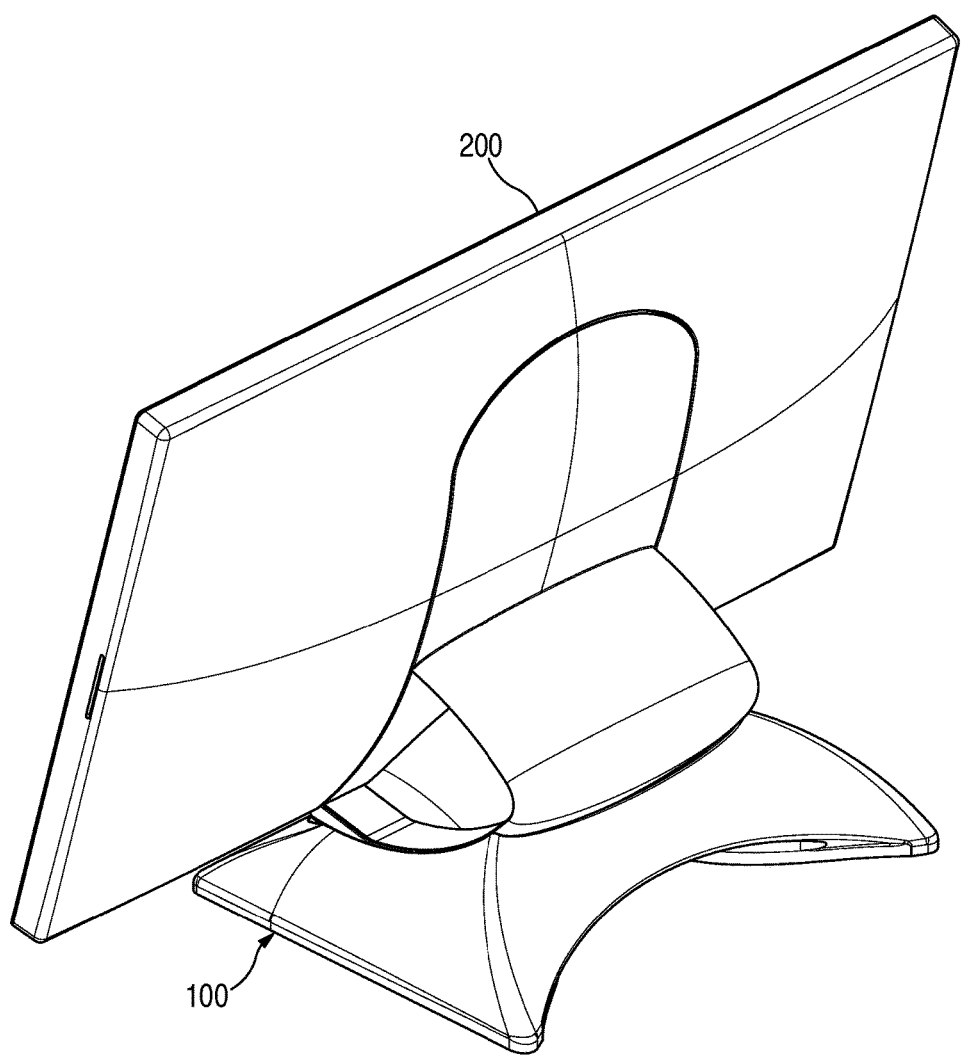

FIG. 2 illustrates a rear perspective view of the constant friction rotating monitor stand of FIG. 1 with a monitor attached thereto according to aspects of the embodiments.

Figure 3:
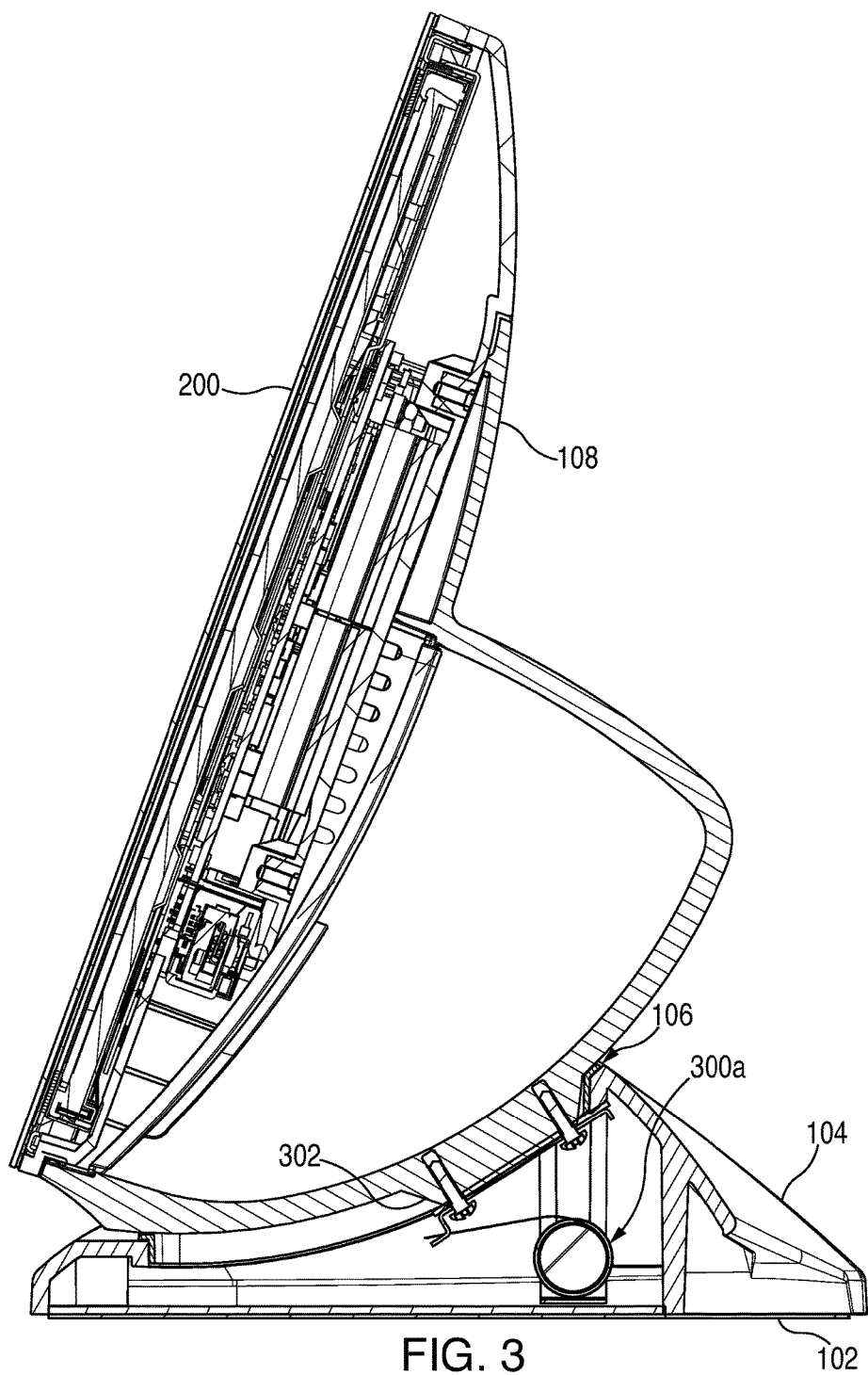

FIG. 3 illustrates a right side sectional view of the constant friction rotating monitor stand of FIG. 1 with a monitor attached thereto, and wherein the view also includes a view of the first embodiment of the constant force spring retention assembly according to aspects of the embodiments.

Figure 4:
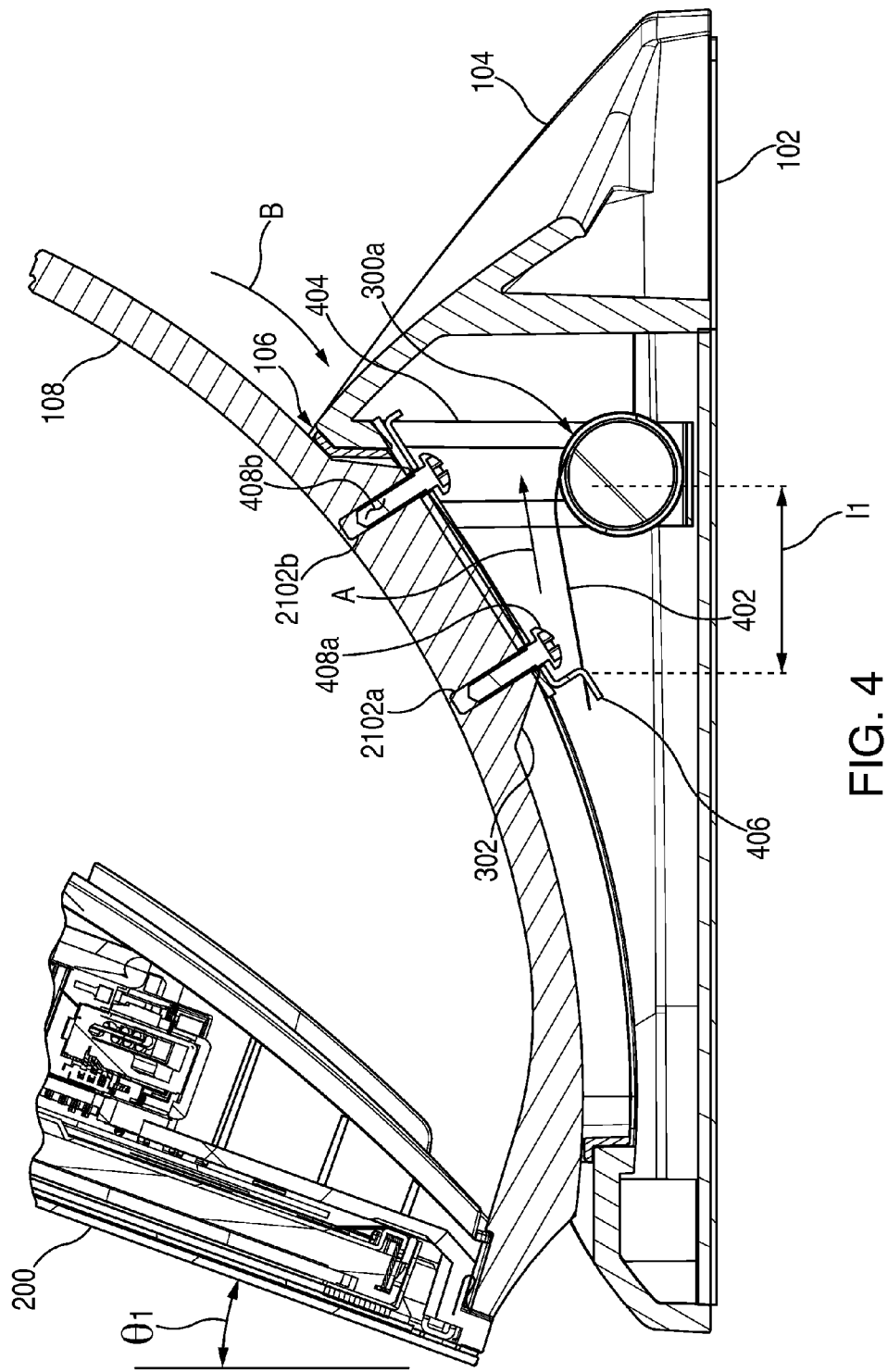

FIG. 4 illustrates a close-up sectional side view of the first embodiment of a constant force spring retention assembly used in the monitor stand of FIG. 1 with a rotational spring extended to a first position according to aspects of the embodiments.

Figure 5:
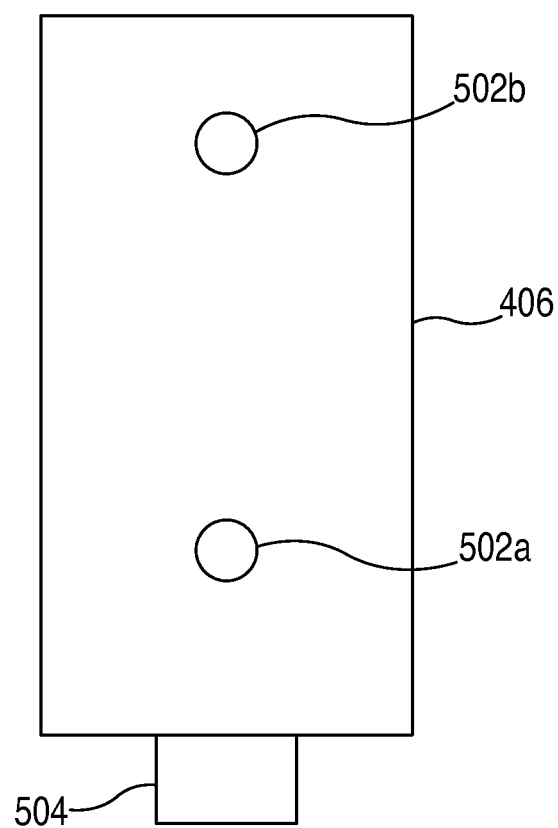

FIG. 5 illustrates a top view of a pressure plate assembly for use with the constant force spring retention assembly of FIG. 4 according to an aspect of the embodiments.

Figure 6A:
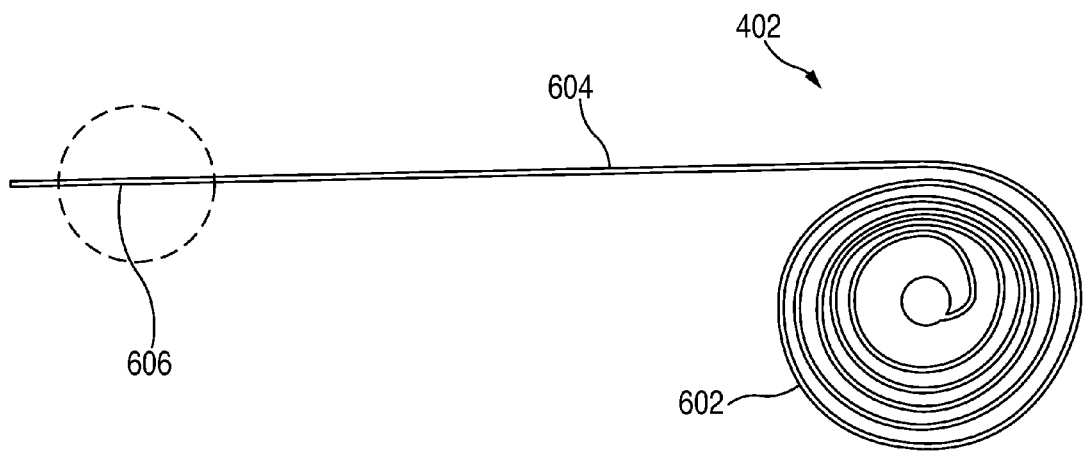
Figure 6B:
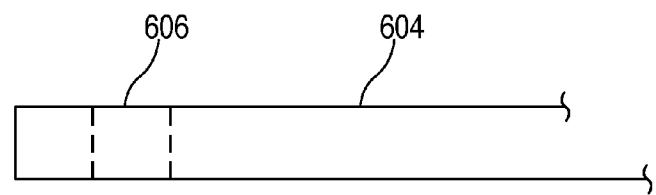

FIGS. 6A and 6B illustrate different views, respectively, of a first embodiment of a constant force spring for use with the constant force spring retention assembly of FIG. 4 according to an aspect of the embodiments.

Figure 7:
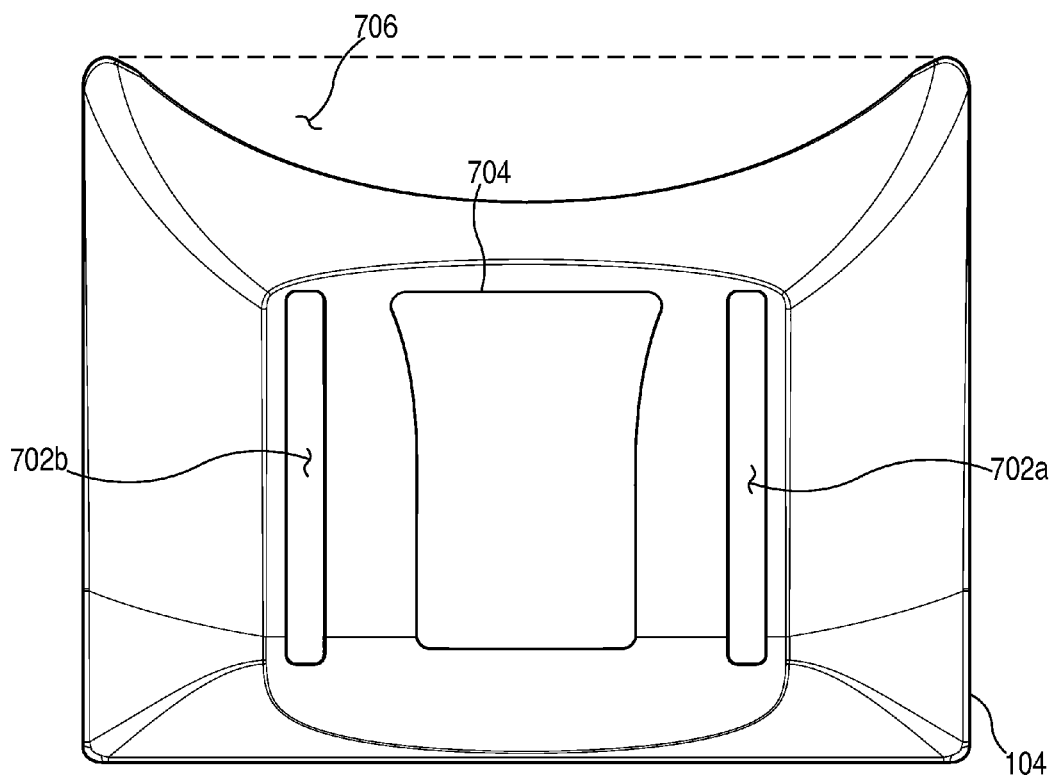

FIG. 7 illustrates a top view of a base enclosure for use with the constant friction rotating monitor stand of FIG. 1 according to aspects of the embodiments.

Figure 8:
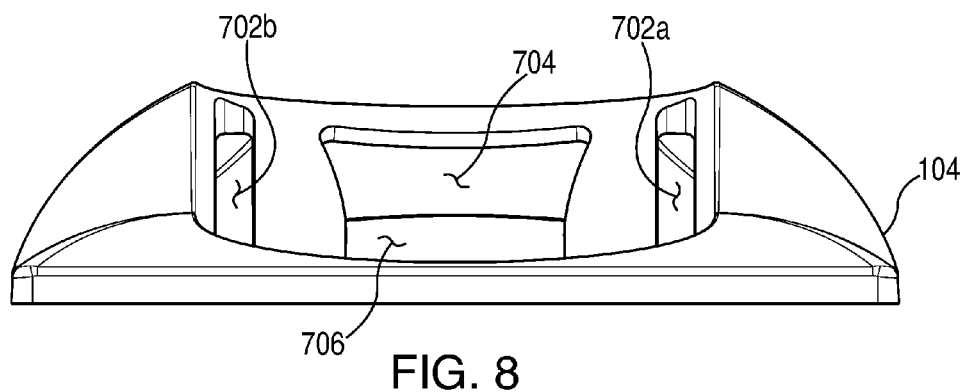

FIG. 8 illustrates a front view of the base enclosure as shown in FIG. 1.

Figure 9:
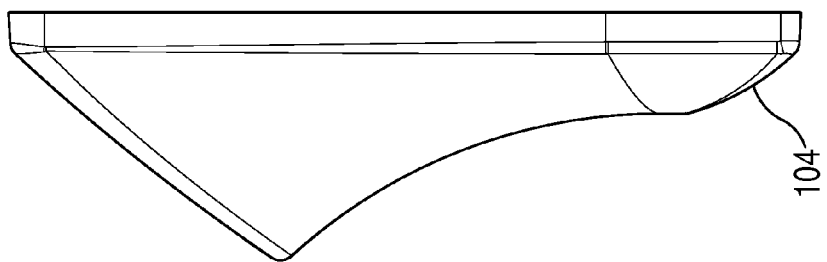

FIG. 9 illustrates a right side view of the base enclosure as shown in FIG. 1.

Figure 10:
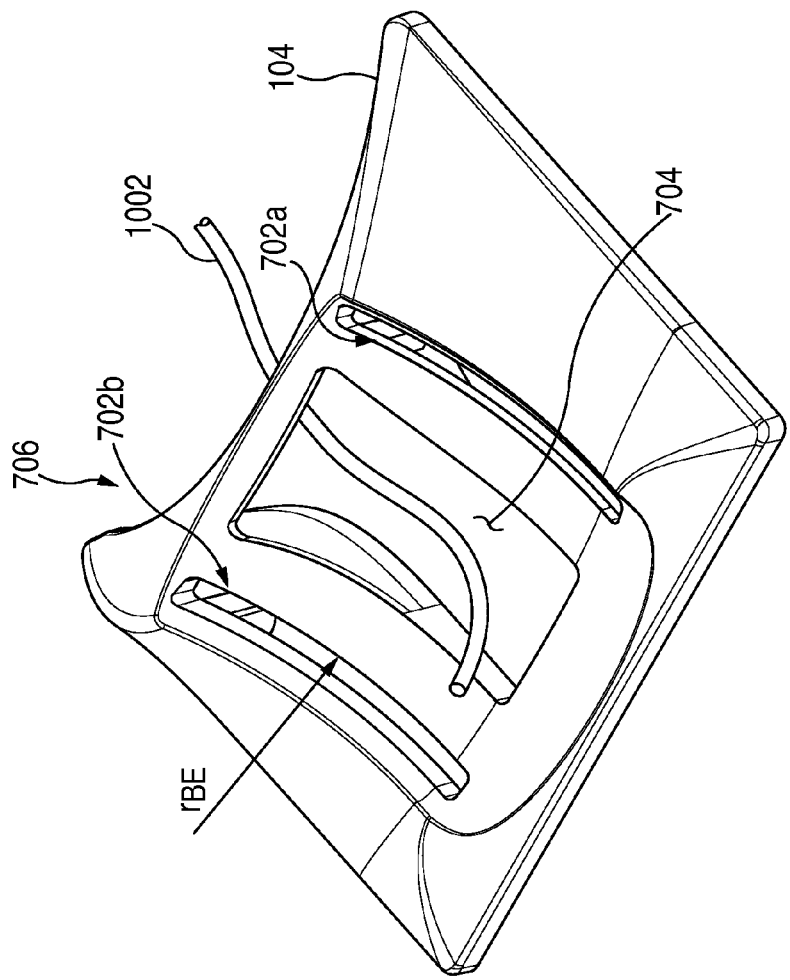

FIG. 10 illustrates a top-front perspective view of the base enclosure as shown in FIG. 1.

Figure 11:
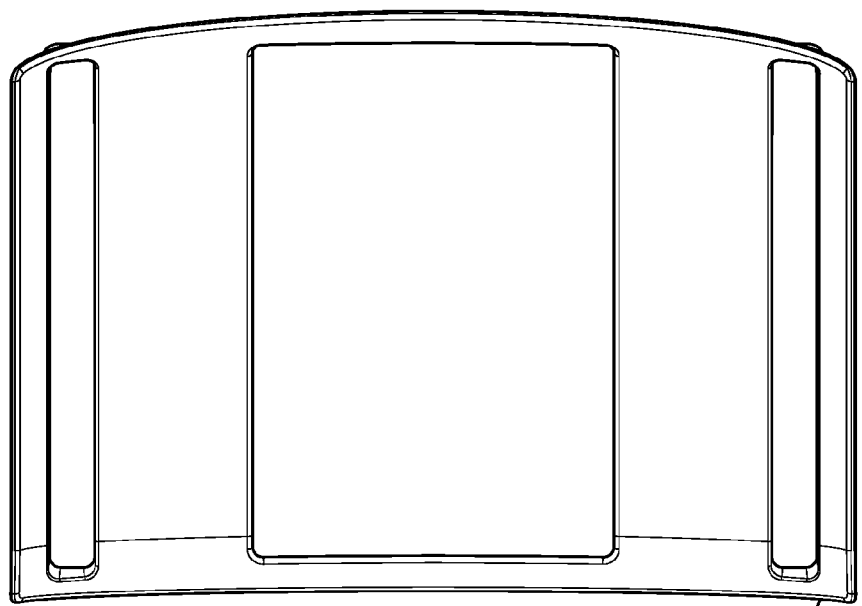

FIG. 11 illustrates a top view of a low friction insert for use with the constant friction rotating monitor stand of FIG. 1 according to aspects of the embodiments.

Figure 12:
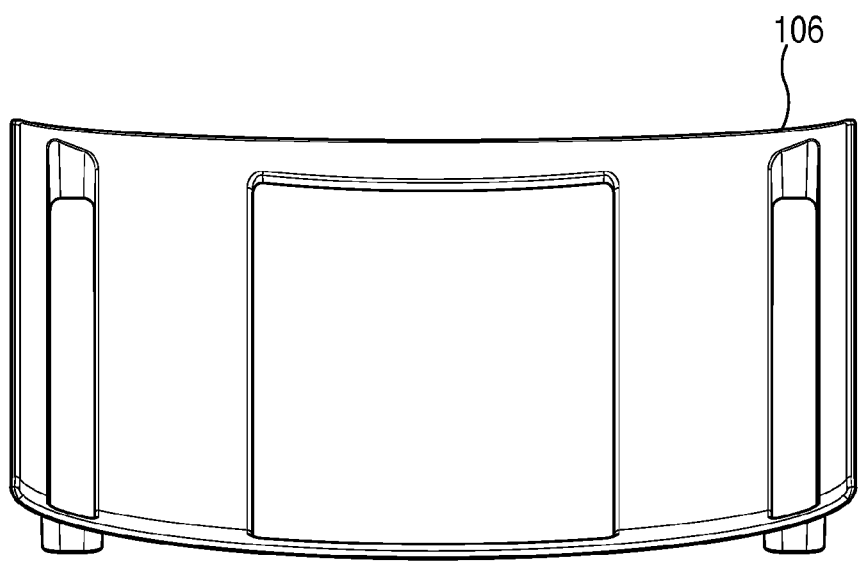

FIG. 12 illustrates a bottom view of the low friction insert as shown in FIG. 1.

Figure 13:
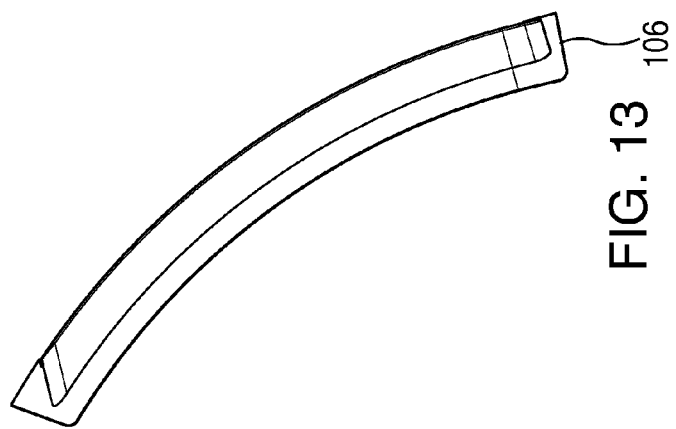

FIG. 13 illustrates a right side view of the low friction insert as shown in FIG. 1.

Figure 14:
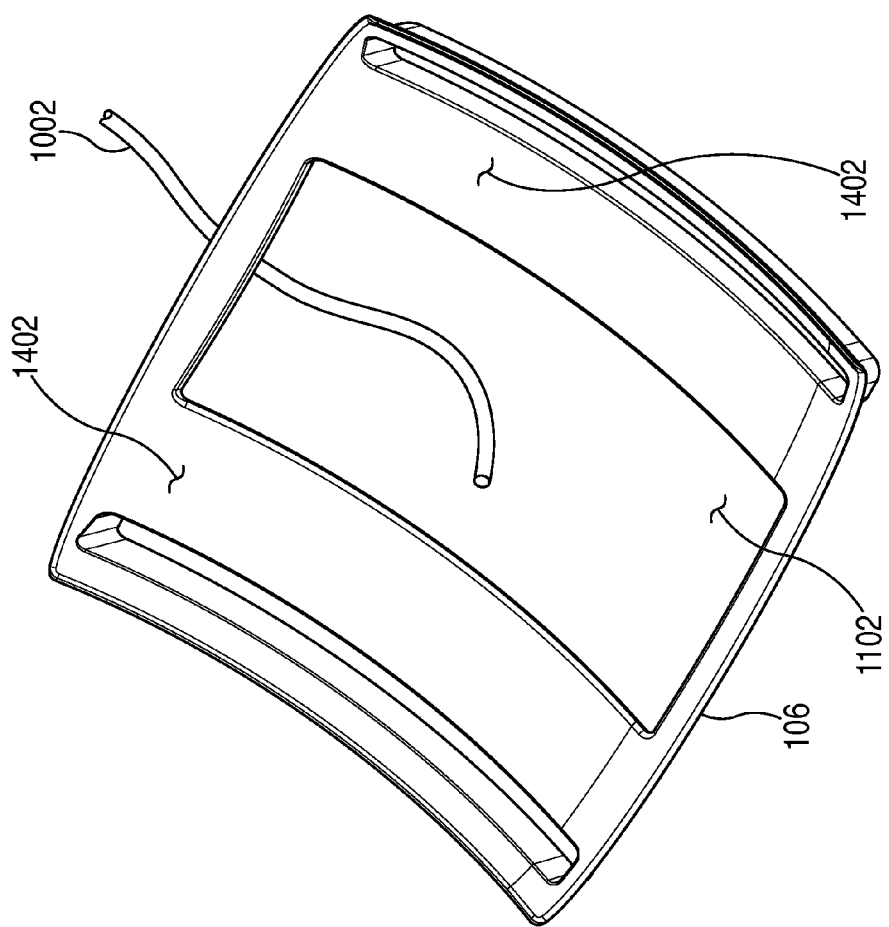

FIG. 14 illustrates a top perspective view of the low friction insert as shown in FIG. 1.

FIG. 15 illustrates a bottom perspective view of the low friction insert as shown in FIG. 1.

FIG. 16 illustrates a top view of a carrier for use with the constant friction rotating monitor stand of FIG. 1 according to aspects of the embodiments.

Figure 17:
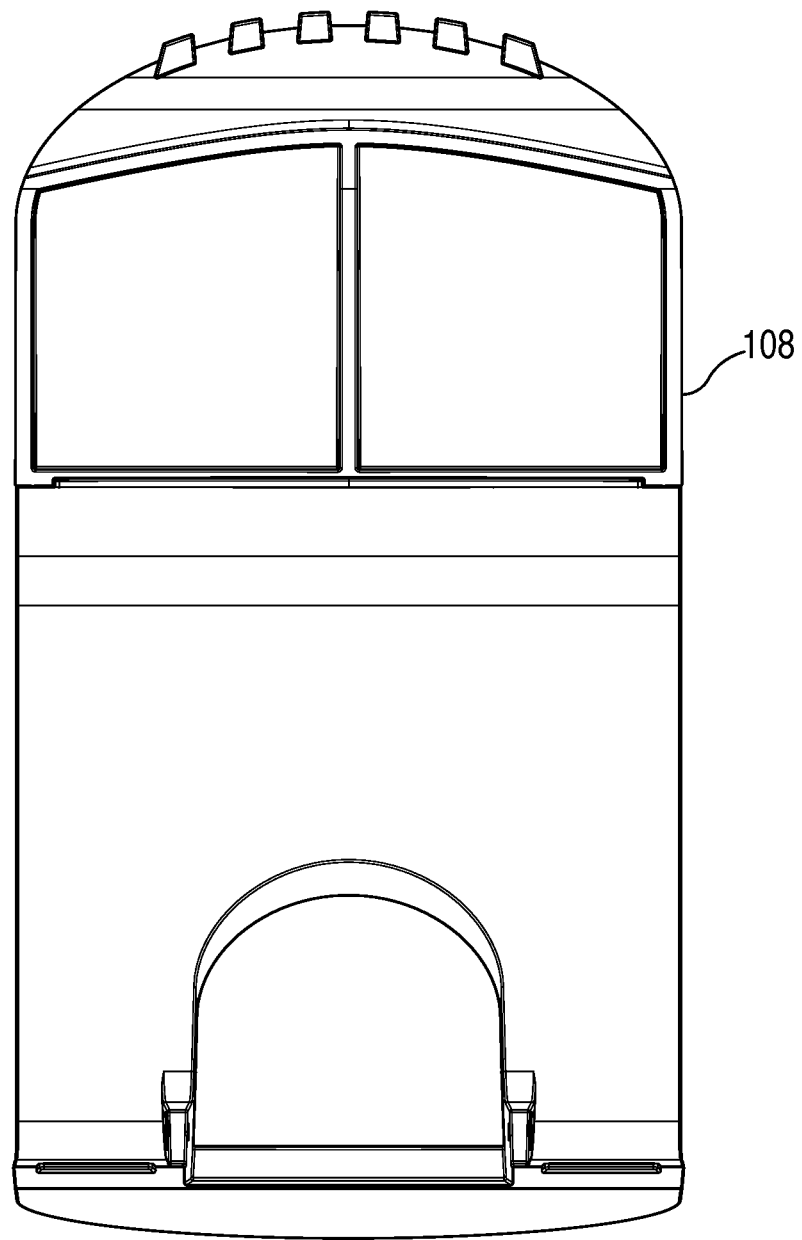

FIG. 17 illustrates a front view of the carrier as shown in FIG. 1.

Figure 18:
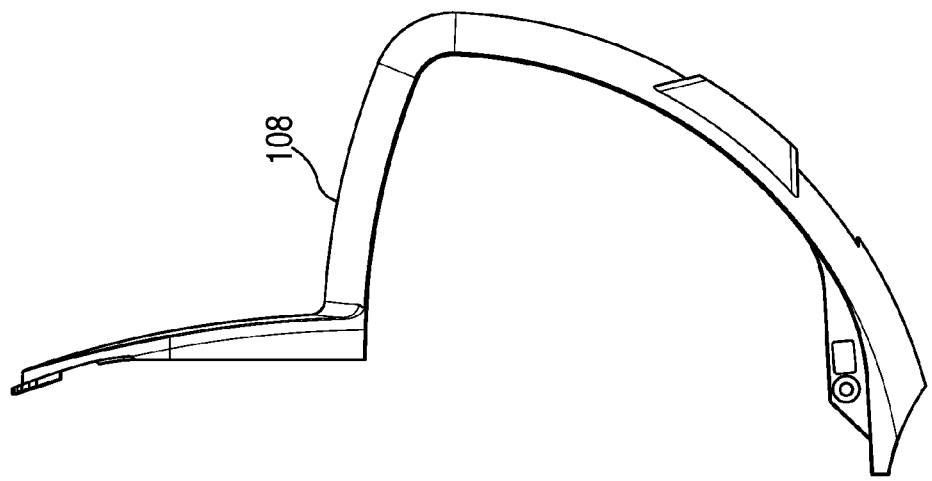

FIG. 18 illustrates a right side view of the carrier as shown in FIG. 1.

Figure 19:
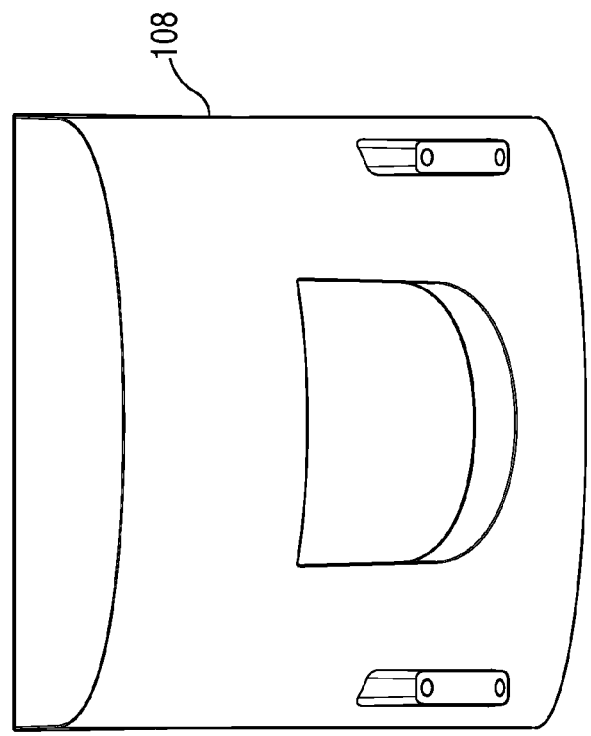

FIG. 19 illustrates a bottom view of the carrier as shown in FIG. 1.

Figure 20:
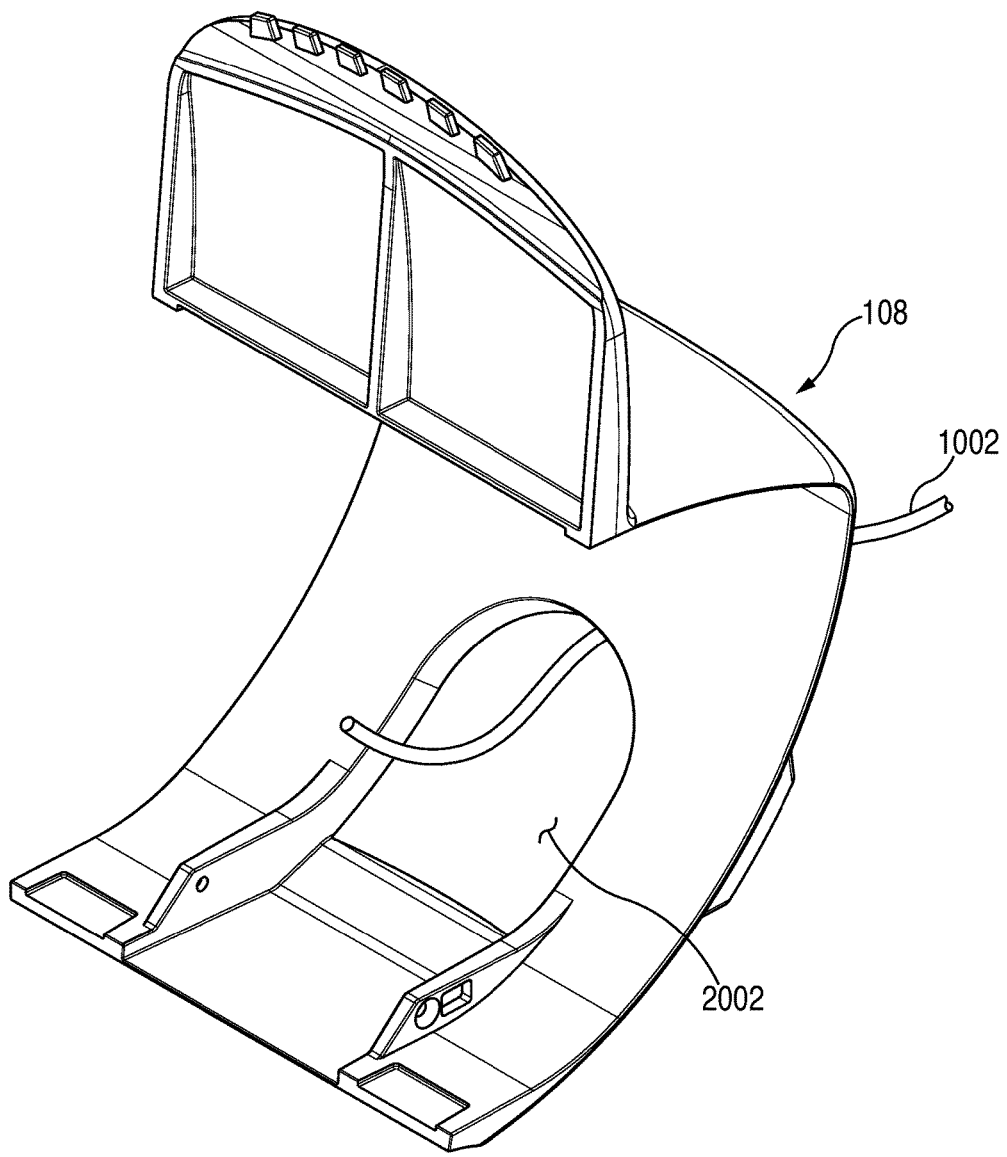

FIG. 20 illustrates a front-top perspective view of the carrier as shown in FIG. 1.

Figure 21:
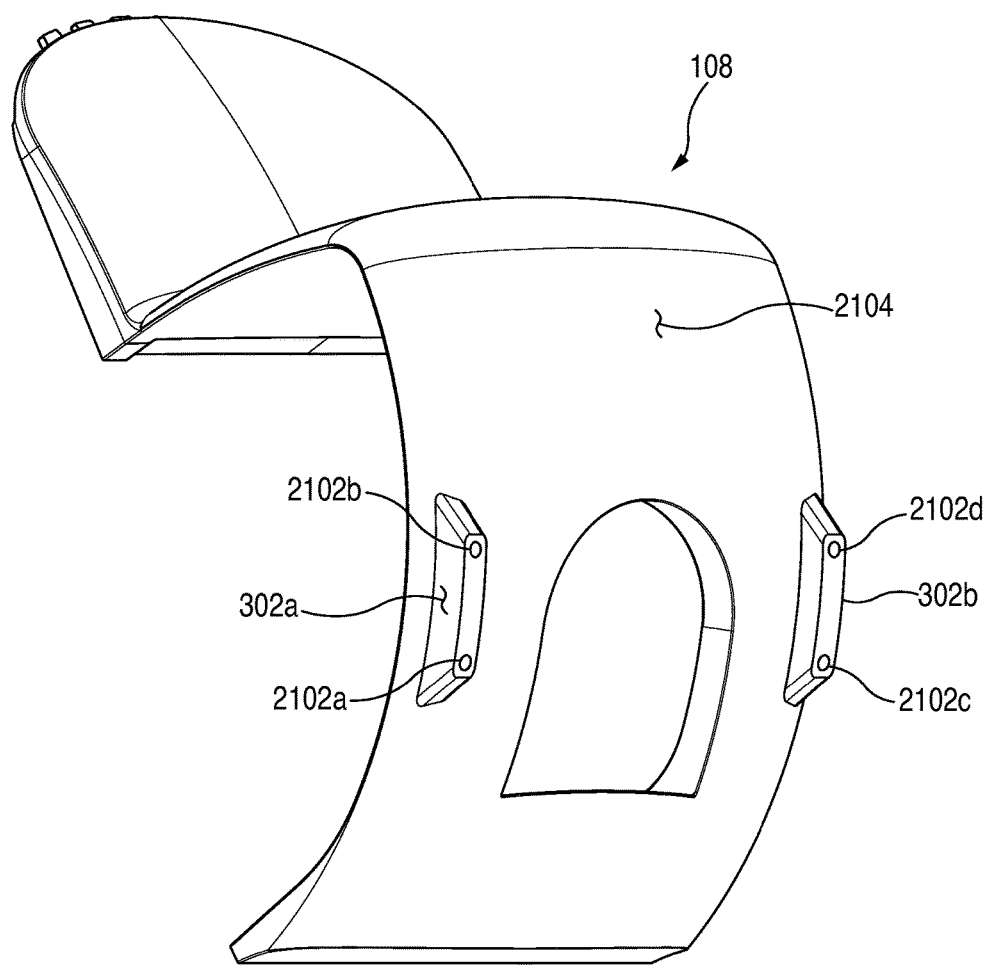

FIG. 21 illustrates a bottom perspective view of the carrier as shown in FIG. 1.

FIG. 22 illustrates a close-up sectional side view of the constant force spring retention assembly used in the constant friction rotating monitor stand of FIG. 1 with the spring extended to a second position according to an aspect of the embodiments.

Figure 23A:
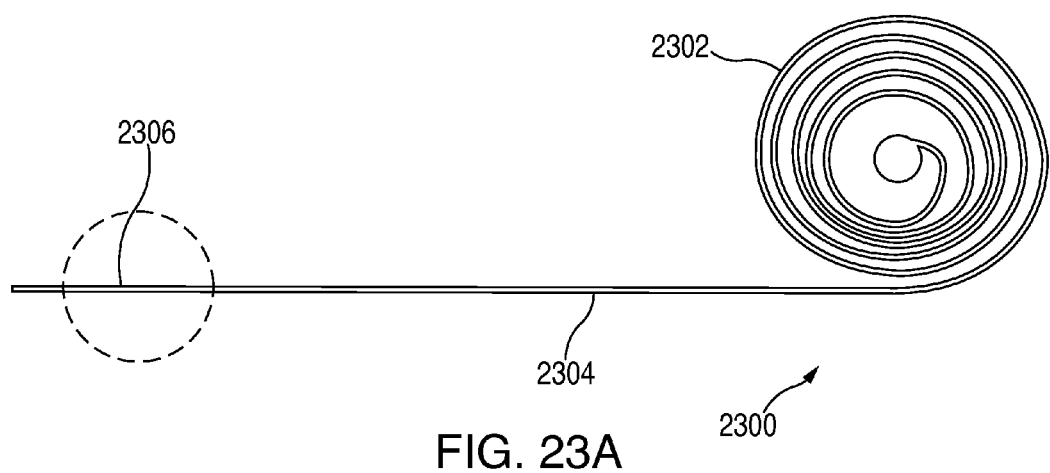
Figure 23B:
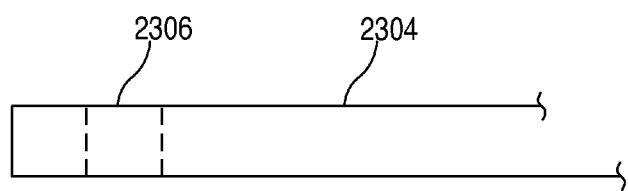

FIGS. 23A and 23B illustrate a right side view of a second embodiment of a constant force spring for use with a second embodiment of the constant force spring retention assembly according to aspects of the embodiments.

FIG. 24 illustrates a close-up sectional side view of the second embodiment of the constant force spring retention assembly for use in the constant friction rotating monitor stand of FIG. 1 with the second embodiment of the spring as shown in FIGS. 23A and 23B extended to a first position according to an aspect of the embodiments.

Figure 25:
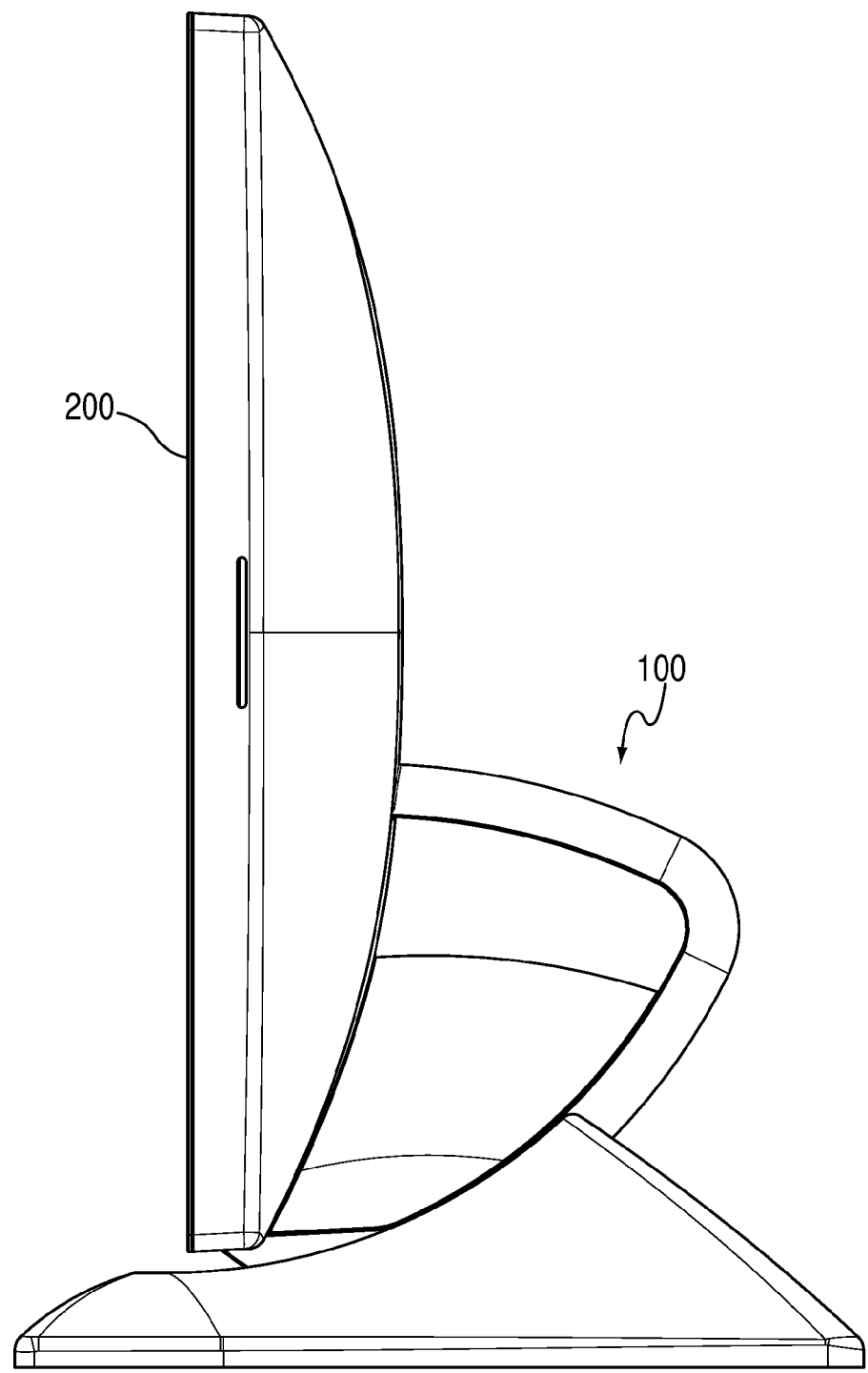

FIG. 25 illustrates a right side view of the rotating monitor stand of FIG. 1 with the monitor rotated to a substantially vertical position.

Figure 26:
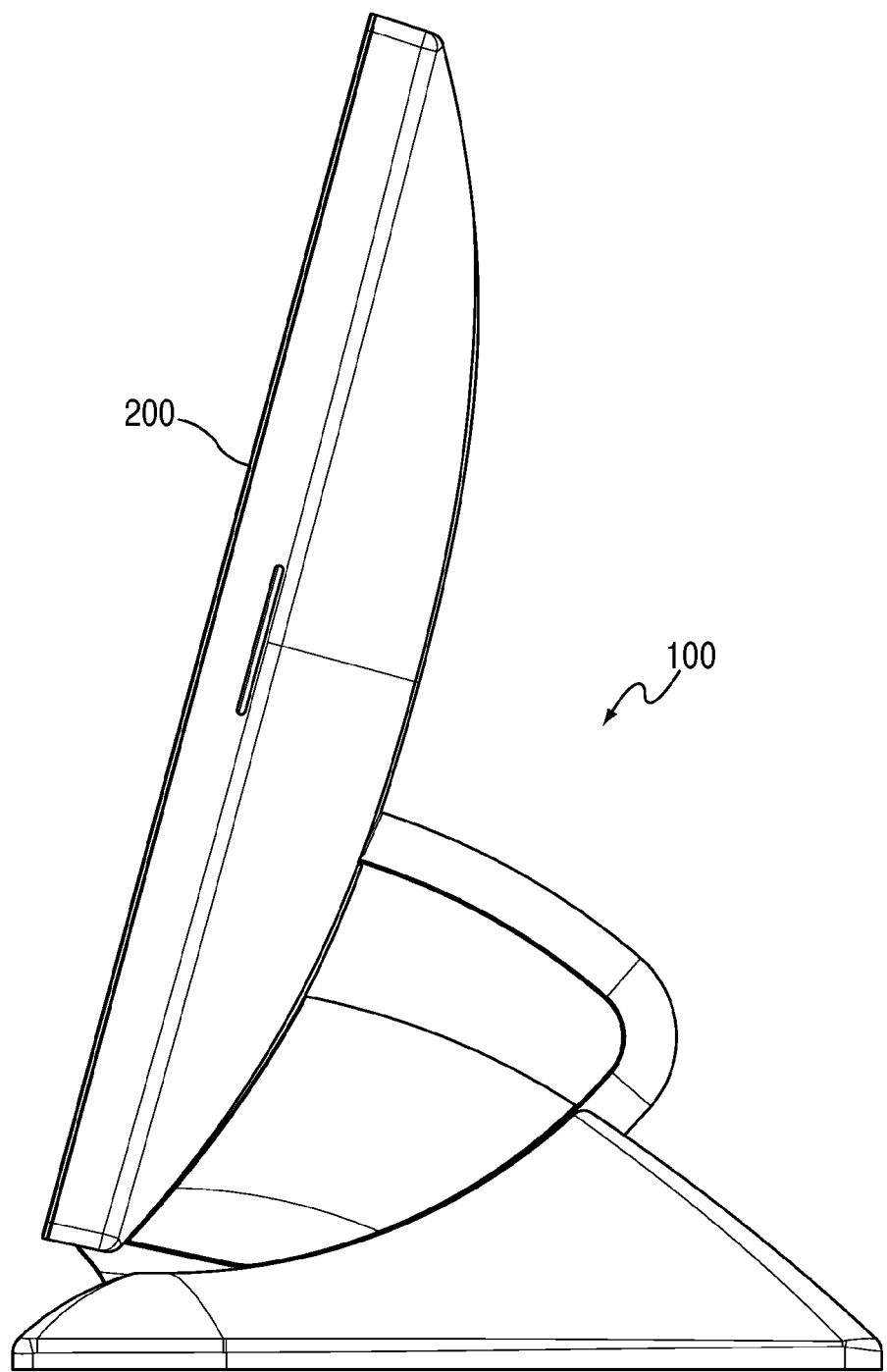

FIG. 26 illustrates a right side view of the monitor stand of FIG. 1 with the monitor rotated to about 15° from the vertical position.

Figure 27:
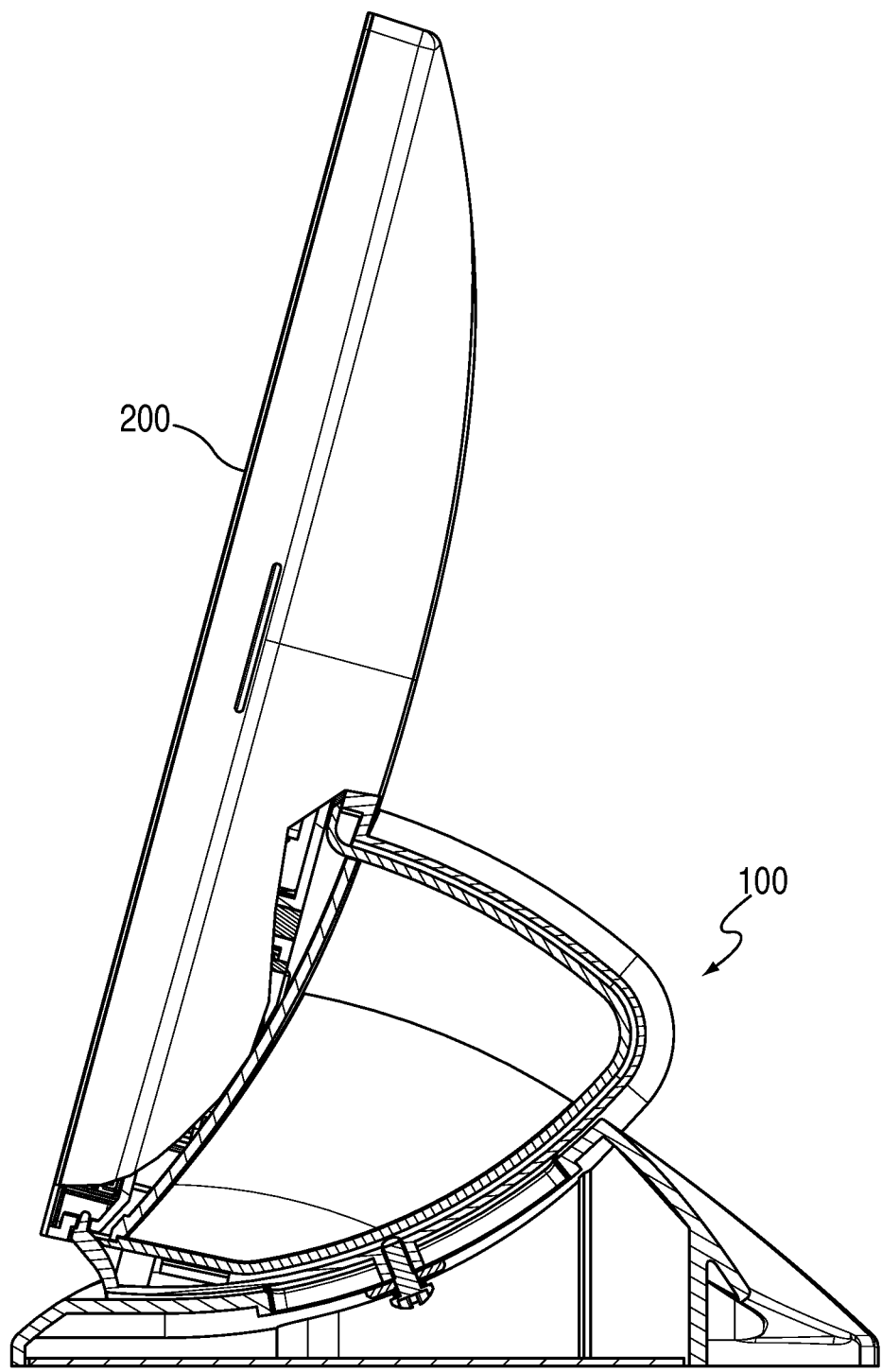

FIG. 27 illustrates a right side partial sectional view of the monitor stand and monitor of FIG. 26.

Figure 28:
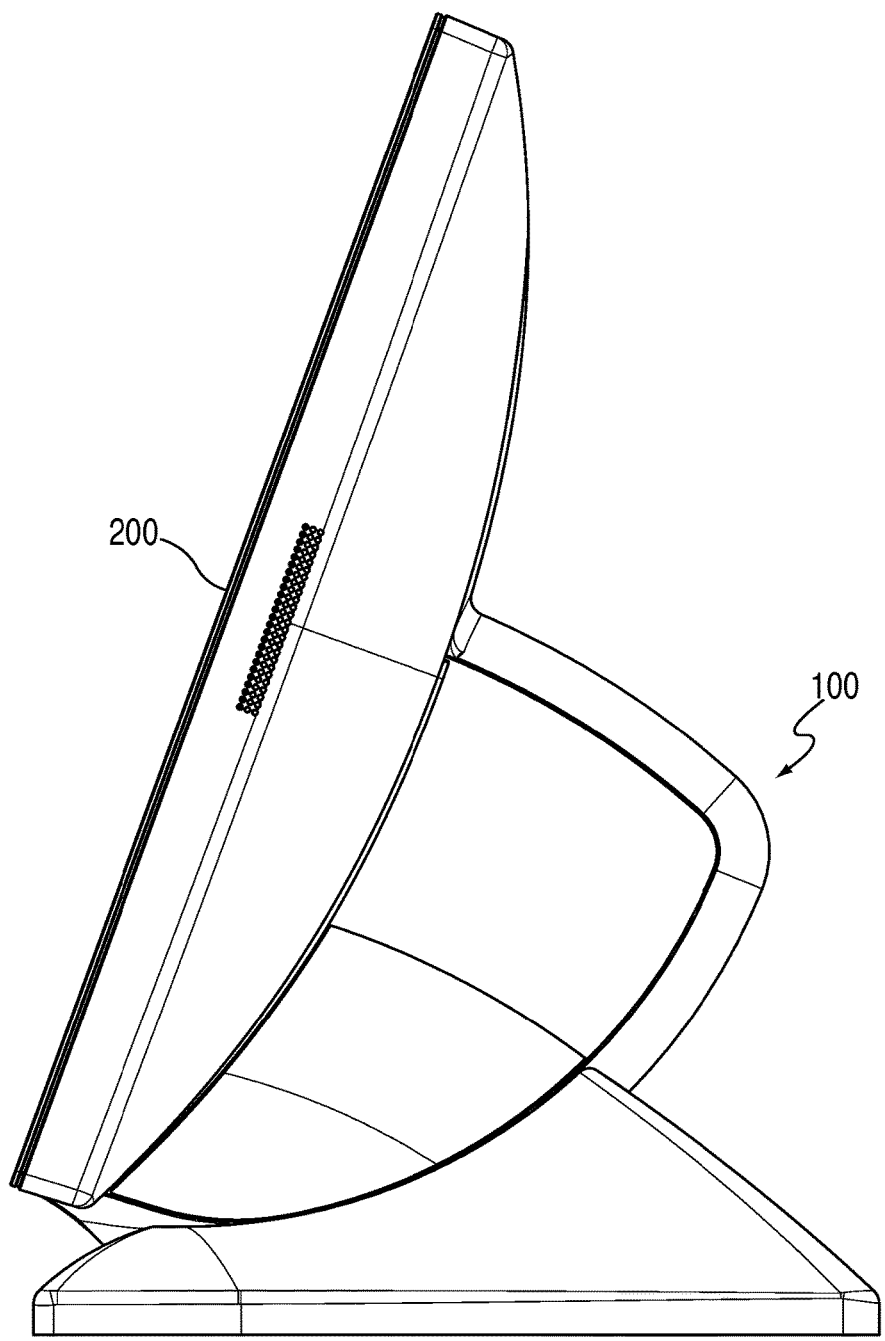

FIG. 28 illustrates a right side view of the monitor stand of FIG. 1 with the monitor rotated to about 20° from the vertical position.

Figure 29:
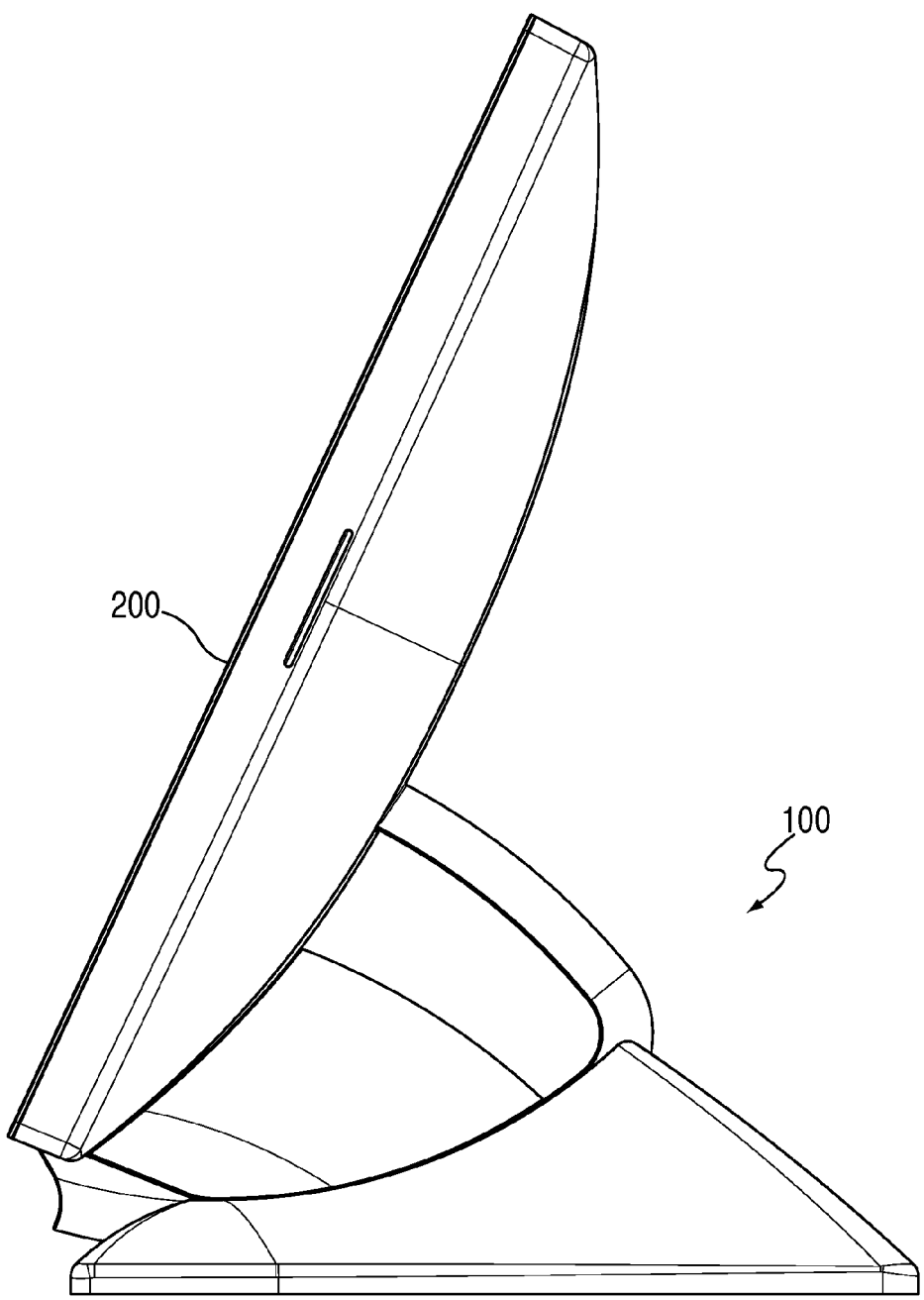

FIG. 29 illustrates a right side view of the monitor stand of FIG. 1 with the monitor rotated to about 25° from the vertical position.

Figure 30:
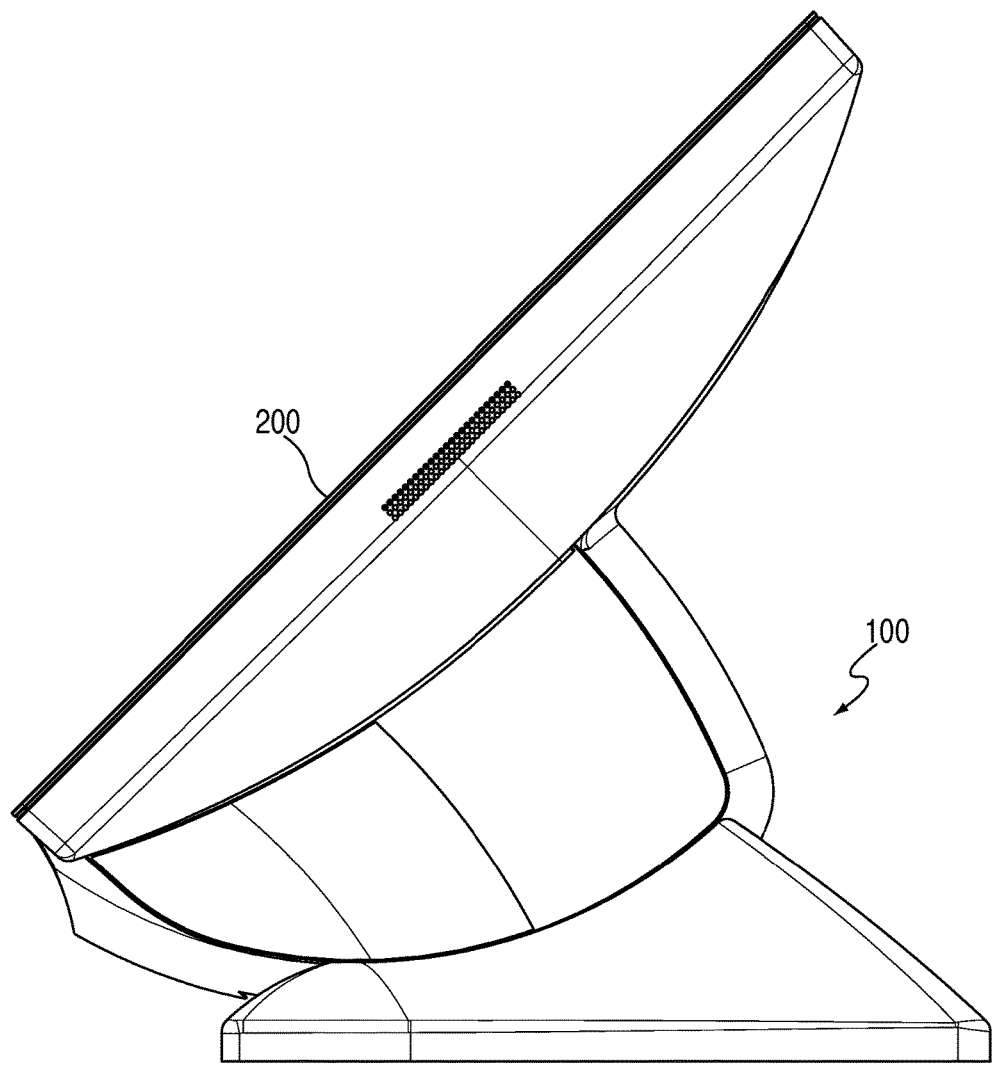

FIG. 30 illustrates a right side view of the monitor stand of FIG. 1 with the monitor rotated to about 45° from the vertical position.

Figure 31:
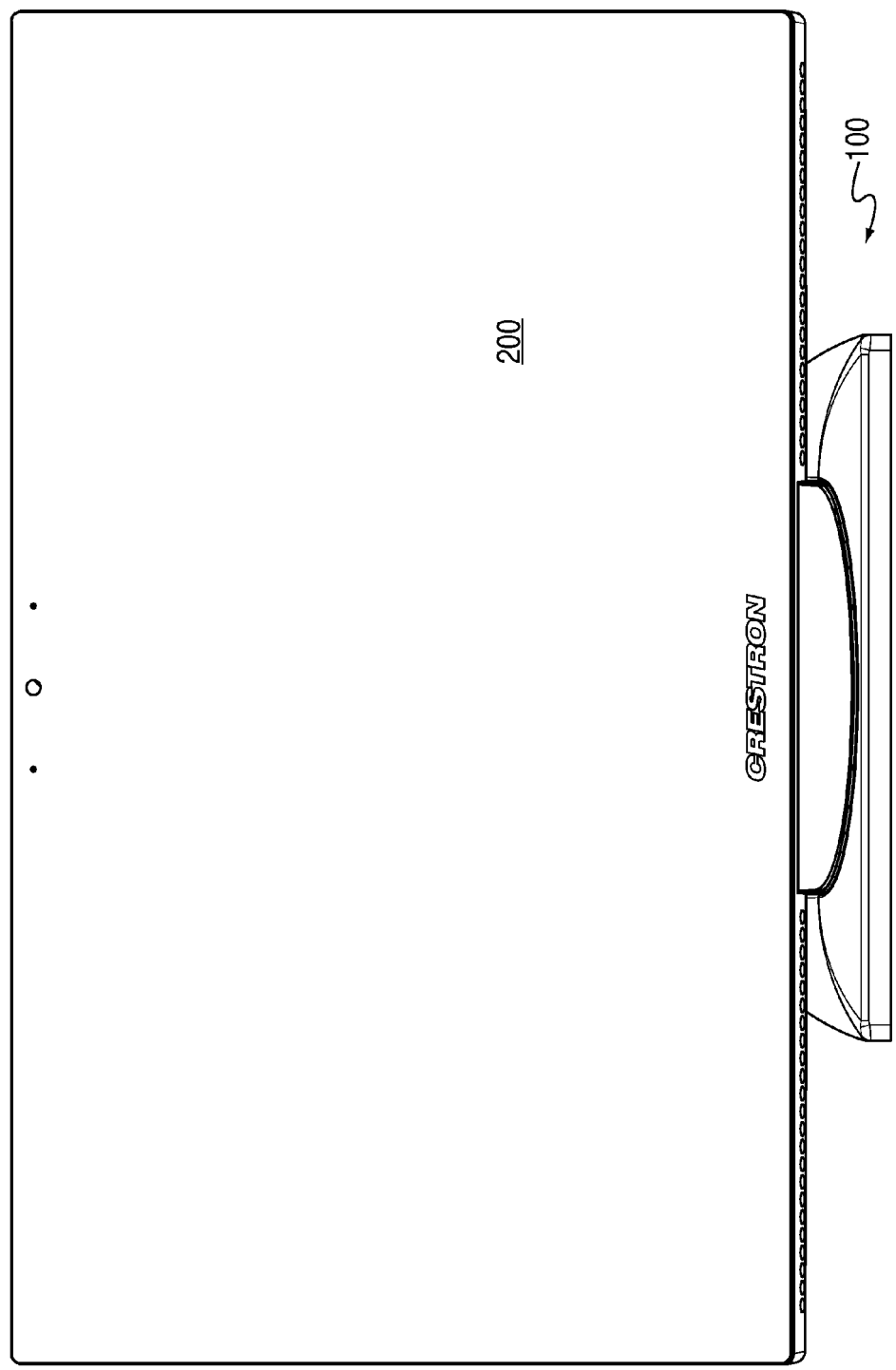

FIG. 31 illustrates a front view of the monitor stand of FIG. 1 with the monitor rotated to about 20° from the vertical position.

Figure 32:
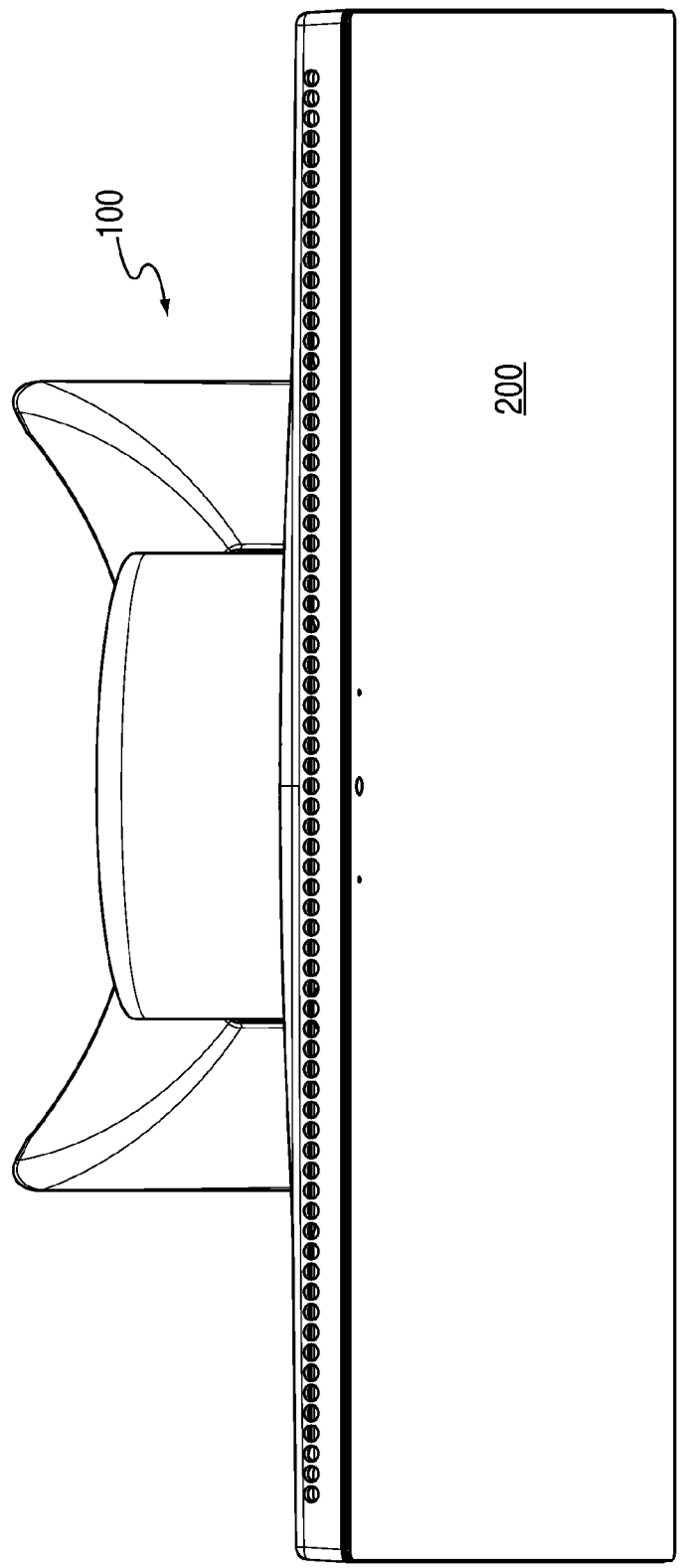

FIG. 32 illustrates a top view of the monitor stand of FIG. 1 with the monitor rotated to about 20° from the vertical position.

Figure 33:
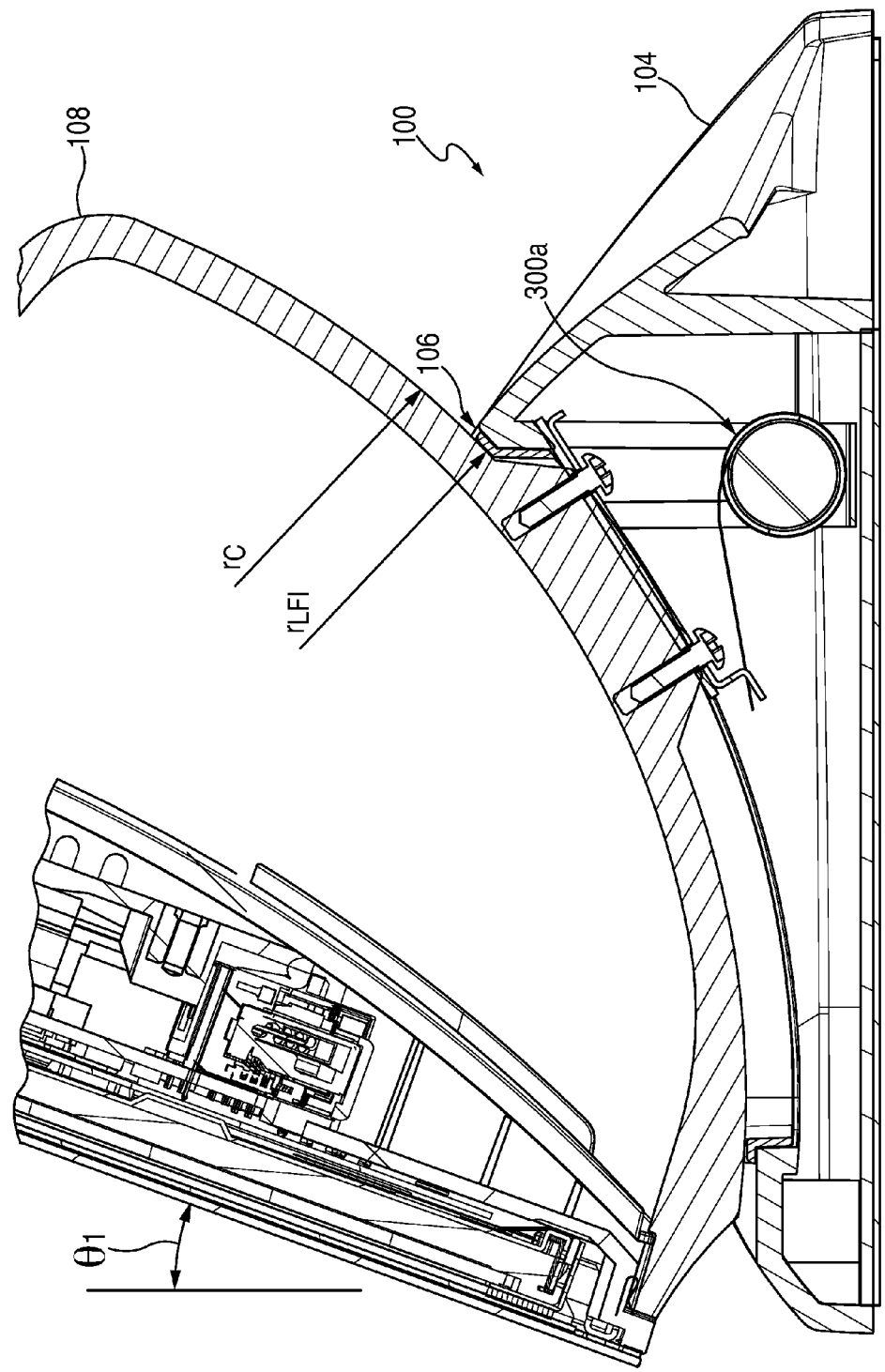
Figure 34:
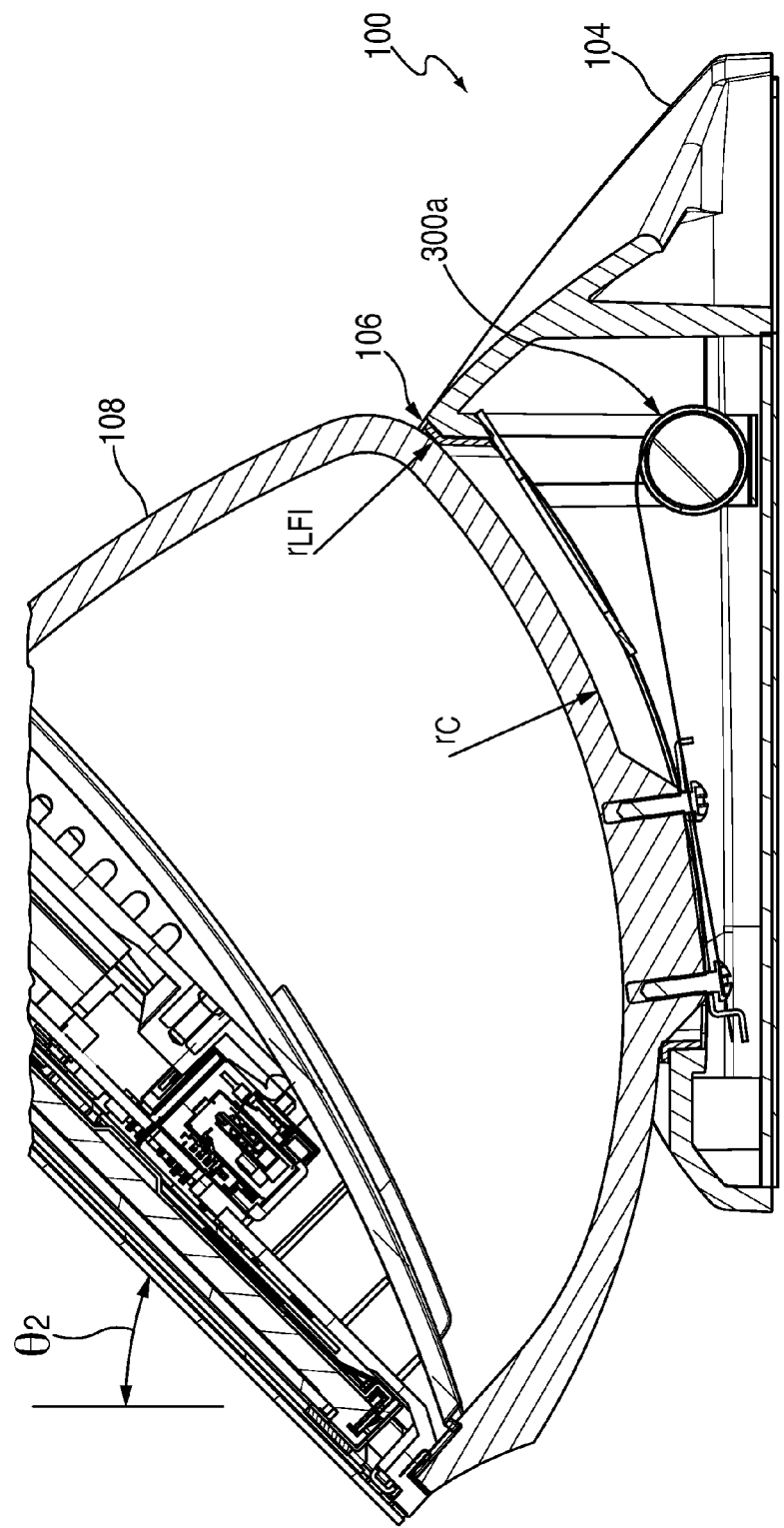

FIGS. 33 and 34 illustrate right side sectional views of monitor stand 100 at a first angular rotation and a second angular rotation illustrating a curvature of surfaces of the carrier, low friction insert, and base enclosure at an interface of the same, according to aspects of the embodiments

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as monitor stands that can hold monitors for use in controlling one or more devices associated with the control systems of a home or commercial environment.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

List of Reference Numbers for the Elements in the Drawings in Numerical Order

The following is a list of the major elements in the drawings in numerical order.
100 Constant Force Spring Rotating Monitor Stand (Monitor Stand)
102 Chassis Plate
104 Base Enclosure
106 Low Friction Insert (LFI)
108 Carrier
110 Carrier Inside Cover
112 Cable Cover
114 Input/Output (I/O) Cover
200 Monitor
300 Spring Retention Assembly (SRA)
302 Mounting Protrusion
402 Rotational Spring (Spring)
404 Spring Assembly Bracket
406 Pressure Plate (PP)
408 Pressure Plate Securing Screws (Screws)
502 Pressure Plate Screw Hole (Holes)
504 Pressure Plate Spring Retention Tab (Tab)
602 Coiled Portion
604 Extended Spring Portion
606 Spring Slot
702 Base Enclosure Channel (Left and Right)
704 First Base Enclosure Opening
706 Second Base Enclosure Opening
1002 Cable
1102 LFI Opening
1402 LFI Engagement Portion
1502 LFI Channel Insertion Portion (Left and Right)
2002 Carrier Opening
2102 Screw Mounting Holes
2104 Carrier Engagement Portion
2300 Second Rotational Spring
2302 Second Rotational Spring Coiled Portion (Coiled Portion)
2304 Second Rotational Spring Extended Spring Portion (Extended Spring Portion)
2306 Second Rotational Spring Slot (Spring Slot)

List of Acronyms Used in the Specification in Alphabetical Order

The following is a list of the acronyms used in the specification in alphabetical order.
HDMI High Definition Multimedia Interface
I/O Input/Output
LFI Low Friction Insert
PC Personal Computer
PP Pressure Plate
SRA Spring Retention Assembly
VGA Video Graphics Array
Mode(s) for Carrying Out the Invention The different aspects of the embodiments described herein pertain to the context of a monitor stand that can rotate and hold in position a monitor for use with an integrated automation system that includes centralized control for controlling numerous devices and systems such as motorized shades, curtains, heating ventilation and air conditioning systems, security systems, lighting systems, audio-video devices, among other systems and devices, in either or both of a residential home and commercial enterprise, but is not limited thereto, except as may be set forth expressly in the appended claims.

FIG. 1 illustrates an exploded view of constant friction rotating monitor stand (monitor stand) 100 that comprises a first embodiment of a constant force spring retention assembly (although not shown in FIG. 1), according to aspects of the embodiments, and FIG. 2 illustrates a rear perspective view of monitor stand of FIG. 1 with monitor 200 attached thereto according to aspects of the embodiments.

For over 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the various aspects of the embodiments described herein, as embodied as monitor stand 100, can be manufactured by Crestron Electronics Inc., located in Rockleigh, N.J.

Referring back to FIG. 1, rotating monitor stand 100 includes, among other components, spring retention assembly 300 (shown in FIG. 3), chassis plate 102, base enclosure 104, low friction insert (LFI) 106, carrier 108, carrier inside cover 110, cable cover 112, and input/output (I/O) cover 114, assembled in the manner as shown in FIG. 1. FIGS. 7-10 illustrates different views of base enclosure 104 according to aspects of the embodiments. FIGS. 11-15 illustrate different views of LFI 106 according to aspects of the embodiments. FIGS. 16-21 illustrate different views of carrier 108 according to aspects of the embodiments. In fulfillment of the dual purposes of clarity and brevity, a detailed discussion of the nature and assembly of these components, except where necessary to understand the aspects of the embodiments, has been omitted from the description herein.

FIG. 3 illustrates a right side sectional view of monitor stand 100 of FIG. 1 with monitor 200 attached thereto, and wherein the view also includes a view of a first embodiment of spring retention assembly (SRA) 300 according to aspects of the embodiments. Chassis plate 102 encloses a bottom-most portion of base enclosure 104, leaving an opening at the rear for cables to go into and out of monitor stand 100. Such cables can include a video cable (video graphics array (VGA) cable, high definition multi-media (HDMI) cable, among other types of video/audio cable) as well as one or more separate power and speaker cables, among other types of cable.

Attention is now directed to FIG. 4, which illustrates a close-up sectional side view of the first embodiment of SRA 300 for use in monitor stand 100 of FIG. 1 with rotational spring (spring) 402 extended to a first position according to aspects of the embodiments. According to further aspects of the embodiments, there can be two such SRAs 300, and therefore two mounting protrusions 302. Attention is also directed to FIGS. 10, 14, 15, and 21.

According to aspects of the embodiments, carrier 108, as shown in FIGS. 16-21, is adapted to be removably attached to, retain, and carry monitor 200. That is, the entire weight of monitor 200 is first borne by carrier 108, and the weight is thereafter transferred to the other components of the assembly of monitor stand 100. Carrier 108 comprises, among other components, right and left mounting protrusions 302a,b. In assembly, right mounting protrusion 302a of carrier 108 fits into right LFI channel insertion portion 1502a (shown in FIG. 15), and LFI channel insertion portion 1502a itself fits into base enclosure channel 702a (shown in FIG. 10). Right mounting protrusion 302a is designed such that it extends just below a bottom-most portion of base enclosure channel 702a so that pressure plate (PP) 406 (which is part of SRA 300) can be assembled thereto, in a manner described in greater detail below. According to further aspects of the embodiments, the opposite components of left mounting protrusion 302b, left LFI channel insertion portion 1502b, and base enclosure channel 702b fit together in a substantially similar manner.

In assembly, therefore, carrier 108 mates and engages with an upper surface of LFI 106, with a frictional interface there between, and LFI 106 sits on top of base enclosure 104. Carrier 108 is adapted to slide, in a frictionally engaging manner, against LFI 106, and LFI 106 remains relatively static with respect to base enclosure 104. That is, carrier engagement portion 2104 (shown as a slightly shaded area in FIG. 21) is adapted to frictionally slide against LFI engagement portion 1402, which is essentially the entire upper surface of LFI 106 (as shown in FIG. 14).

According to aspects of the embodiments, carrier 108 can be manufactured from a first material that has a particular coefficient of friction in regard to a second material that can be used to manufacture LFI 106. According to further aspects of the embodiments, the selection of the first and second materials can be such that the respective coefficient of friction between them is adapted to work with spring 402 in such a manner that the spring constant k is a reasonably affordable and attainable value that can be readily designed from commonly available metals, and the like. That is, according to aspects of the embodiments, it is desirable to obtain readily affordable components, and as such, the first and second materials and spring 402 would all be selected to make an affordable monitor stand 100 according to aspects of the embodiments. According to further aspects of the embodiments, the first material can be one of aluminum, glass filled polycarbonate, or other similar material or plastics. According to further aspects of the embodiments, the second material can be one of nylon, delrin, Teflon, or other similar materials.

In addition, right and left mounting protrusions 302a,b are adapted to be inserted into and frictionally engage with left and right low friction insert channel insertion portions 1502a,b (shown in FIG. 15), respectively. The longer side walls of right and left mounting protrusions 302a,b are adapted to slide against the inner side walls of LFI channel insertion portions 1502a,b, in a substantially similar frictionally engaging manner as the engagement portions 2104 and 1402.

Referring again to FIG. 4, SRA 300 comprises rotational spring 402, spring assembly bracket 404 (to hold spring 402), PP 406, and PP securing screws (screws) 408. PP 406 is shown in detail in FIG. 5, and comprises first and second screw holes (holes) 502a,b and spring retention tab (tab) 504. PP 406 is affixed to mounting protrusion 302 by securing screws 408 into screw mounting holes 2102 (more clearly seen in FIG. 21). In addition, there is a frictional engagement between PP 406 and lower surface of LFI channel insertion portion 1502 because PP 406 overhangs on both sides of mounting protrusions 302; thus, mounting protrusions 302 are designed to be of such height that when PP 406 is attached to mounting protrusions 302, PP 406 slides against a lower surface of base LFI channel insertion portion 1502. Thus, third material is chosen to manufacture PP 406 such that a certain amount of friction is generated between PP 406 and the lower surface of base LFI channel insertion portion 1502. According to further aspects of the embodiments, the third material can be one of spring steel, phosphor bronze, beryllium copper, or some other similar material.

As those of skill in the art can appreciate, additional means for securing PP 406 to mounting protrusion 302 can be used in accordance with aspects of the embodiments. PP 406 is adapted to include tab 504 that interfaces with spring 402. Referring to FIGS. 6A and 6B, which illustrate spring 402, it can be seen that spring 402 comprises coiled portion 602, extended spring portion 604, and spring slot 606. Spring slot 606 is adapted to receive tab 504 of PP 406 to secure spring 402 to PP 406, which is secured to carrier 108 (which carries monitor 200). According to further aspects of the embodiments, mounting protrusions 302 can be manufactured with tabs that retain spring 402 in a substantially similar manner as does PP 406, or, spring 402 can be secured directly to mounting protrusion 302 via screws 408 and screw mounting holes 2102, as those of skill in the art can appreciate.

Furthermore, as those of skill in the art can appreciate, monitors 200 can be relatively heavy. Because of gravity, monitor 200 and monitor stand 100 wants to rotate in a clockwise direction (when viewed as in FIGS. 4 and 22, in the direction of arrow B in FIG. 4) and "bottom out" at about a 45° angle off of vertical. However, there are at least three sources of friction plus the force provided by spring 402 that counteracts the gravitational pull to keep monitor 200 and monitor stand 100 substantially stable, regardless of the angular placement it is positioned to according to aspects of the embodiments. The three main sources of friction are: (a) the interface between carrier engagement portion 2104 and LFI engagement portion 1402; (b) the interface between the outer surfaces of mounting protrusions 302 and inner walls of base enclosure channels 702; and (c) the interface between PP 406 and a lower surface of LFI channel insertion portion 1502. The force exerted by spring 402 acts in the direction of arrow A in FIG. 4 to pull back carrier 108 and monitor 200 in the direction that opposes the rotational motion caused by gravity.

Reference is now made to FIGS. 4 and 22, which illustrate two different extensions of spring 402 that correspond to two different angular placements of monitor 200 on monitor stand 100 according to aspects of the embodiments. In FIG. 4, spring 402 is extended a distance $I_1$, and monitor 200 is at a first angle $\theta_1$ of about 20°. In FIG. 22, a user has rotated monitor 200 to a second angle $\theta_2$ of about 45°, and spring 402 has been extended to a second distance $I_2$. According to aspects of the embodiments, rotational spring 402 asserts a substantially constant force over the range of rotation angles of monitor 200; that is, regardless of the rotation of monitor stand 100, the force exerted by spring 402 is substantially constant. Those of skill in the art can appreciate that while the spring constant is substantially constant, so that when the distance changes between $I_1$ and $I_2$ the force is different, the change in force is a substantially small fraction of the overall force exerted by spring 402 such that it can be considered negligible. The force generated by spring 402 is such that when monitor stand 100 is rotated to its uppermost position (about 20°) and exerts the greatest down-ward rotating force due to gravity (or clockwise, as viewed in the direction of arrow B shown in FIGS. 4 and 22), the friction generated by the interactions discussed above and the force of spring 402 keep monitor stand 100 substantially still.

Attention is directed to FIGS. 23A and 23B, which illustrate second rotational spring (rotational spring) 2300. It can be seen in FIG. 23 that spring 2300 comprises second rotational spring coiled portion (coiled portion) 2302, second rotational spring extended spring portion (extended spring portion) 2304, and second rotational spring slot (spring slot) 2306. Spring slot 2306 is adapted to receive tab 504 of PP 406 to secure rotational spring 2300 to PP 406, which is secured to carrier 108 (which carries monitor 200). According to further aspects of the embodiments, mounting protrusions 302 can be manufactured with tabs that retain rotational spring 2300 in a substantially similar manner as does PP 406, or, rotational spring 230 can be secured directly to mounting protrusion 302 via screws 408 and screw mounting holes 2102, as those of skill in the art can appreciate.

Reference is now made to FIG. 24, which illustrates an extension of rotational spring 2300 that corresponds to an angular placement of monitor 200 on monitor stand 100' according to aspects of the embodiments. Monitor stand 100', which is substantially similar in all features as monitor stand 100 except as described herein, comprises second SRA 2400. Second SRA 2400 includes substantially all the same components, arranged in a substantially similar manner, as that of SRA 300, with the exception of second rotational spring 2300, which is rotated in manner opposite to that of spring 402. Nonetheless, the force exerted by second rotational spring 2300, shown by arrow C in FIG. 24, is applied in a substantially similar direction as the force exerted by spring 402 as shown by arrow A in FIG. 4, and acts in a substantially similar manner to counter-act rotation of monitor stand 100' in a clockwise direction (as viewed in the direction of FIG. 24).

Attention is now directed to the balance of the Figures. FIG. 7 illustrates a top view of base enclosure 104 for use with monitor stand 100 of FIG. 1 (and monitor stand 100') according to aspects of the embodiments, FIG. 8 illustrates a front view of base enclosure 104, FIG. 9 illustrates a right side view of base enclosure 104, and FIG. 10 illustrates a top-front perspective view of base enclosure 104. With reference to each of FIGS. 7-10, 11-15, 16-21, and 25-32, described below, only monitor stand 100 is referenced; however, it should be understood that, as described above, each of these Figures also describes use of monitor stand 100' according to aspects of the embodiments.

FIG. 11 illustrates a top view of low friction insert 106 for use with monitor stand 100 of FIG. 1 according to aspects of the embodiments, FIG. 12 illustrates a bottom view of low friction insert 106, FIG. 13 illustrates a right side view of low friction insert 106, FIG. 14 illustrates a top perspective view of low friction insert 106, and FIG. 15 illustrates a bottom perspective view of low friction insert 106.

FIG. 16 illustrates a top view of carrier 108 for use with monitor stand 100 of Figure according to aspects of the embodiments, FIG. 17 illustrates a front view of carrier 108, FIG. 18 illustrates a right side view of carrier 108, FIG. 19 illustrates a bottom view of carrier 108, FIG. 20 illustrates a front-top perspective view of carrier 108, and FIG. 21 illustrates a bottom perspective view of carrier 108.

FIG. 25 illustrates a right side view of monitor stand 100 with monitor 200 rotated to a substantially vertical position, FIG. 26 illustrates a right side view of monitor stand 100 with monitor 200 rotated to about 15° from the vertical position, and FIG. 27 illustrates a right side partial sectional view of monitor stand 100 and monitor 200 of FIG. 26. FIG. 28 illustrates a right side view of monitor stand 100 with monitor 200 rotated to about 20° from the vertical position, FIG. 29 illustrates a right side view of monitor stand 100 with monitor 200 rotated to about 25° from the vertical position, and FIG. 30 illustrates a right side view of monitor stand 100 with monitor 200 rotated to about 45° from the vertical position. FIG. 31 illustrates a front view of monitor stand 100 of FIG. 1 with monitor 200 rotated to about 20° from the vertical position, and FIG. 32 illustrates a top view of monitor stand 100 with monitor 200 rotated to about 20° from the vertical position.

According to further aspects of the embodiments, monitor stand 100 (and 100') incorporates additional further features that make it versatile and functional in regard to use with monitor 200. As briefly discussed above, there are openings in several of the components of monitor stand 100 that enable one or more cables for use with monitor 200; as those of skill in the art can appreciate, monitor 200 does not necessarily limit the device carried by carrier 108 to be just a monitor; it can also be an "all-in-one" personal computer, meaning that the cables that traverse through the openings can include power, printer, network, and speaker cables, and the like.

Attention is directed to FIGS. 7, 8, 10, 11, 14, and 20. As shown in FIGS. 7 and 8, there is an opening in the central portion of base enclosure 104 referred to as first base enclosure opening 704. Also shown in FIG. 7 is second base enclosure opening 706, which is formed at a rear portion of base enclosure 104. Both of first and second base enclosure openings 704, 706 are also shown and referenced in FIG. 8; in this Figure, it can be readily seen that second base enclosure opening 706 is formed by making a rear portion of base enclosure 104 in such a manner that there is a raised portion of the rear portion forming the second opening 706. FIG. 10 illustrates how cable 1002 can readily pass through first and second base enclosure openings 704, 706.

FIG. 14 is a top perspective view of LFI 106, and illustrates LFI opening 1102, through which cable 1002 can pass. LFI 106 is designed and fabricated to fit over base enclosure 104 in such a manner that LFI opening 1102 aligns with first base enclosure opening 704 so that cable 1002 can pass through the two items when joined together. FIG. 20 illustrates a front perspective view of carrier 108; also shown in FIG. 20 is carrier opening 2002, through which cable 1002 passes through as shown. When carrier 108 is located through assembly of monitor stand 100/100' on top of LFI 106, which is then located on top of base enclosure 104, all of the openings are substantially aligned; however, since carrier 108 moves relative to LFI 106 and base enclosure 104 (the latter two which are stationary and mated together in the manner described above), carrier opening 2002 can be larger in length according to an aspect of the embodiments (to accommodate the rotation of carrier 108) than either of LFI opening 1102 and first base enclosure 704. According to further aspects of the embodiments, carrier opening 2002, LFI opening 1102 and first base enclosure can all be of substantially similar length. Thus, in combination, cable 1002 can pass through carrier opening 2002, LFI opening 1102, first base enclosure opening 702, and then through second base enclosure opening 706 according to aspects of the embodiments. In this manner, monitor 200 can be rotated between a first angle of rotation to a second angle or rotation and the cables connecting monitor 200 to peripheral equipment can be hidden out of sight, and will not bind nor become entangled with any portion of monitor stand 100/100' according to aspects of the embodiments.

According to still further aspects of the embodiments, monitor stand 100 (and 100') incorporates additional further features that make it versatile and functional in regard to use with monitor 200. Attention is directed towards FIGS. 1, 10, 33, and 34. As shown in FIG. 1, monitor stand 100 (and monitor stand 100') comprises several components including, among others, carrier 108, LFI 106 and base enclosure 104. According to aspects of the embodiments, each of carrier 108, LFI 106, and base enclosure 14 are designed and fabricated, as described above, to interface with each in a manner that allows a user or operator of monitor stand 100 to readily and easily rotate monitor 200 to any angular placement between about 20° to about 45° from the vertical for viewing. As part of the means for accomplishing the rotation between the two angular displacements, the components described above are designed and manufactured to interface with each other in a substantially close and fitting manner.

To effectuate this close and fitting interface, each of carrier 108, LFI 106 and base enclosure 104 have a portion thereof manufactured with a substantially similar curvature, as shown in detail in FIG. 10 (with respect to base enclosure 104), and FIGS. 33 and 34 (with respect to LFI 106 and carrier 108). That is, referring to FIG. 10, base enclosure 104 is shown and the portion thereof that interfaces with LFI 106 (and carrier 108) has a curvature $r_{BE}$ as shown in the Figure. The curvature $r_{BE}$ can be that of an ellipse, or oval, or it can be circular, or it can be some other curvature that it is not readily identifiable by a mathematical operation but nonetheless is fixed and ascertainable and designed and implemented to make operation of monitor stand 100 perform in the manner intended. Curvatures $r_C$ and $r_{LFI}$, which are, respectively, the curvature of the surfaces of carrier 108 and LFI 106 and are designed to be substantially similar to $r_{BE}$. That is, according to an aspect of the embodiments, $r_{BE}$ is substantially equal to $r_{LFI}$, which is substantially equal to $r_C$. According to further aspects of the embodiments, the curvatures $r_{BE}$, $r_{LFI}$, and $r_C$ do not necessarily define a radius of curvature, but instead define a curved surface such as that shown in the Figures.

As discussed in regard to the Figures above, reference is made to several dimensions, including several radii, angles, height, among other dimensions. Those of skill in the art can appreciate that although examples of dimensions are provided, these should not be taken in a limiting manner; that is, the aspects of the embodiments are not to be construed as defined or limited by the specific example of the dimensions shown and discussed, but instead are provided merely for illustrating an example of what a device that incorporates the aspects of the embodiments could, in a non-limiting manner, look like. Furthermore, as those of skill in the art can appreciate, since the aspects of the embodiments are directed towards a physical object, with dimensional characteristics, all of the parts will have various dimensions, some of which are not shown in fulfillment of the dual purposes of clarity and brevity. According to still further aspects of the embodiments, some of these objects will have dimensional characteristics that lend themselves to aesthetic aspects; in fulfillment of the dual purposes of clarity and brevity, dimensions in this regard have also been omitted. Therefore, as the aspects of the embodiments are directed towards a rotating monitor stand for use with a monitor, it is to be understood that the dimensions of the different objects, some dimensions shown, some dimensions not shown, will be understood by those of skill in the art.

INDUSTRIAL APPLICABILITY

To solve the aforementioned problems, the aspects of the embodiments are directed towards a monitor stand that can rotate and hold in position a monitor for use as a stand-alone monitor (or display), or for use with a computer (such as, but not limited to a personal computer), or for use with an integrated automation system that includes centralized control for controlling numerous devices such as motorized shades, curtains, heating ventilation and air conditioning systems, security systems, lighting systems, audio-video devices and systems, among others, in either or both of a residential home and commercial enterprise The disclosed embodiments provide a monitor stand system for supporting and rotating a monitor to a desired position. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A monitor stand for holding a monitor and maintaining a position of the monitor, the monitor stand comprising:
a carrier adapted to removably and fixedly hold the monitor, the carrier including first and second trapezoidal shaped cubic mounting protrusions disposed on a bottom surface of the carrier;
a base enclosure adapted to provide a substantially stable platform to hold the monitor in a variable upright condition, the base enclosure including first and second base enclosure channels;
a low friction insert adapted to be inserted between the carrier and the base enclosure and to provide a frictional engagement with the carrier, the low friction insert including first and second channel insertion portions having outer walls adapted to fit securely into the first and second base enclosure channels, respectively, and prevent movement of the low friction insert with respect to the base enclosure, and having inner walls configured to receive the first and second trapezoidal shaped cubic mounting protrusions of the carrier, respectively,
wherein a portion of the bottom surface of the carrier, at least a portion of each of top and bottom surfaces of the low friction insert, and a portion of a top surface of the base enclosure each have a substantially same curved shape so that the carrier is rotatable between a first angular placement and a second angular placement about a first non-vertical axis as a result of the first and second trapezoidal shaped cubic mounting protrusions sliding along the inner walls of the first and second channel insertion portions and the portion of the bottom surface of the carrier sliding against the at least portion of the top surface of the low friction insert; and
first and second spring retention assemblies, each of which is adapted to provide a substantially constant rotational spring force against a downward rotational movement of the monitor, and which are affixed to the first and second protrusions respectively, and which are further adapted to provide the substantially constant rotational spring force in a plane that is substantially perpendicular to the first non-vertical axis.

2. The monitor stand according to claim 1, wherein
the first angular placement is about 20° from a vertical placement of the monitor, and
the second angular placement is about 45° from a vertical placement of the monitor.

3. The monitor stand according to claim 1, wherein the downward rotational movement is caused by one or more of user-induced movement and gravity.

4. The monitor stand according to claim 1, wherein each of the first and second spring retention assemblies comprises:
a spring assembly bracket affixed to the base enclosure; and
a substantially constant force rotational spring affixed to the spring assembly bracket, extendible from a first distance when the monitor is at minimum angular displacement with respect to a substantially perpendicular displacement, to a second distance when the monitor is at a maximum angular displacement with respect to the substantially perpendicular displacement.

5. The monitor stand according to claim 4, wherein
the spring force generated by the rotational spring is substantially constant when the rotational spring is extended to one of or between the first and second distances.

6. The monitor stand according to claim 4, further comprising:
first and second pressure plates affixed to the first and second trapezoidal shaped cubic mounting protrusions, respectively, the first and second pressure plates each including a respective tab adapted to retain a first end of the rotational springs of the first and second spring retention assemblies, respectively, and secure that rotational spring to the carrier.

7. The monitor stand according to claim 6, wherein the rotational springs of the first and second spring retention assemblies each comprises:
a hole located at the first end of the rotational spring, the hole being adapted to fit about the respective tab and to retain the rotational spring to the pressure plate.

8. The monitor stand according to claim 1, wherein
the low friction insert is adapted to generate a frictional interface force between itself and the carrier, such that the generated frictional interface force combines with the spring force of the spring retention assemblies to counter rotational motion caused by a weight of the monitor.

9. The monitor stand according to claim 8, wherein
the generated frictional interface force is a function of the frictional coefficient between a first material of which the carrier is made and a second material of which the low friction insert is made, and
the first material is selected from the group consisting of aluminum and glass filled polycarbonate,
and the second material is selected from the group consisting of nylon, delrin, and Teflon.

10. The monitor stand according to claim 8, wherein
the generated frictional interface force is generated as a result of contact between a plurality of surfaces areas of the low friction insert and a plurality of corresponding surfaces areas of the carrier.

11. The monitor stand according to claim 10, wherein the generated frictional interface force is generated as a result of one or more of:
contact between a plurality of exterior surface area parts of the first and second trapezoidal shaped cubic mounting protrusions and a plurality of surface area parts of the inner walls of the first and second channel insertion portions; and
contact between the portion of the bottom surface of the carrier and the at least portion of the upper surface of the low friction insert.

12. A system, comprising:
a monitor; and
a monitor stand for holding the monitor and maintaining a position of the monitor according to claim 1.

13. The system according to claim 12, wherein
the monitor is selected from the group consisting of: a display monitor, and a personal computer all-in-one device.

14. A monitor stand for holding a monitor and maintaining a position of the monitor, the monitor stand comprising:
a carrier adapted to removably and fixedly hold the monitor, the carrier including first and second trapezoidal shaped cubic mounting protrusions disposed on a bottom surface of the carrier;
a base enclosure adapted to provide a substantially stable platform to hold the monitor in a variable upright condition, the base enclosure including first and second base enclosure channels;
a low friction insert adapted to be inserted between the carrier and the base enclosure and to provide a frictional engagement with the carrier, the low friction insert including first and second channel insertion portions having outer walls adapted to fit securely into the first and second base enclosure channels respectively and prevent movement of the low friction insert with respect to the base enclosure, and having inner walls configured to receive the first and second trapezoidal shaped cubic mounting protrusions of the carrier, respectively,
wherein a portion of the bottom surface of the carrier, at least a portion of each of top and bottom surfaces of the low friction insert, and a portion of a top surface of the base enclosure each have a substantially same curved shape so that the carrier is rotatable between a first angular placement and a second angular placement about a first non-vertical axis as a result of the first and second trapezoidal shaped cubic mounting protrusions sliding along the inner walls of the first and second channel insertion portions and the portion of the bottom surface of the carrier sliding against the at least portion of the top surface of the low friction insert;
first and second spring retention assemblies, each of which is adapted to provide a substantially constant rotational spring force against a downward rotational movement of the monitor, and which are affixed to the first and second protrusions respectively, and which are further adapted to provide the substantially constant rotational spring force in a plane that is substantially perpendicular to the first non-vertical axis, wherein each of the first and second spring retention assemblies comprises:
a spring assembly bracket affixed to the base enclosure, and
a substantially constant force rotational spring affixed to the spring assembly bracket, extendible from a first distance when the monitor is at minimum angular displacement with respect to a substantially perpendicular displacement, to a second distance when the monitor is at a maximum angular displacement with respect to the substantially perpendicular displacement, the spring force generated by the rotational spring is substantially constant when the rotational spring is extended at and between the first and second distances; and
first and second pressure plates affixed to the first and second trapezoidal shaped cubic mounting protrusions, respectively, the first and second pressure plates each including a respective tab adapted to retain a first end of the rotational springs of the first and second spring retention assemblies, respectively, and secure that rotational spring to the carrier, wherein the rotational springs of the first and second spring retention assemblies each comprises a hole located at the first end of the rotational spring, the hole being adapted to fit about the respective tab and to retain the rotational spring to the pressure plate.

15. A system, comprising:
a monitor; and
a monitor stand for holding the monitor and maintaining a position of the monitor according to claim 14.

16. The system according to claim 15, wherein
the monitor is selected from the group consisting of: a display monitor, and a personal computer all-in-one device.

17. A monitor stand for holding a monitor and maintaining a position of the monitor, the monitor stand comprising:
a carrier adapted to removably and fixedly hold the monitor, the carrier including first and second trapezoidal shaped cubic mounting protrusions disposed on a bottom surface of the carrier;

a base enclosure adapted to provide a substantially stable platform to hold the monitor in a variable upright condition, the base enclosure including first and second base enclosure channels;

a low friction insert adapted to be inserted between the carrier and the base enclosure and to provide a frictional engagement with the carrier, the low friction insert including first and second channel insertion portions having outer walls adapted to fit securely into the first and second base enclosure channels respectively and prevent movement of the low friction insert with respect to the base enclosure, and having inner walls configured to receive the first and second trapezoidal shaped cubic mounting protrusions of the carrier, respectively, wherein a portion of the bottom surface of the carrier, at least a portion of each of top and bottom surfaces of the low friction insert, and a portion of a top surface of the base enclosure each have a substantially same curved shape so that the carrier is rotatable between a first angular placement and a second angular placement about a first non-vertical axis as a result of the first and second trapezoidal shaped cubic mounting protrusions sliding along the inner walls of the first and second channel insertion portions and the portion of the bottom surface of the carrier sliding against the at least portion of the top surface of the low friction insert, and the low friction insert is adapted to generate a frictional interface force between itself and the carrier, such that the generated frictional interface force combines with the spring force of the spring retention assemblies to counter rotational motion caused by a weight of the monitor, the generated frictional interface force is a function of the frictional coefficient between a first material of which the carrier is made, and a second material of which the low friction insert is made, the first material being selected from the group consisting of aluminum and glass filled polycarbonate, and the second material being selected from the group consisting of nylon, delrin, and Teflon, the generated frictional interface force is generated as a result of contact between a plurality of surfaces areas of the low friction insert and a plurality of corresponding surfaces areas of the carrier; and first and second spring retention assemblies, each of which is adapted to provide a substantially constant rotational spring force against a downward rotational movement of the monitor, and which are affixed to the first and second protrusions respectively, and which are further adapted to provide the substantially constant rotational spring force in a plane that is substantially perpendicular to the first non-vertical axis.

18. The monitor stand according to claim 17, wherein the generated frictional interface force is generated as a result of one or more of:

contact between a plurality of exterior surface area parts of the first and second trapezoidal shaped cubic mounting protrusions and a plurality of surface area parts of the inner walls of the first and second channel insertion portions; and contact between the portion of the bottom surface of the carrier and the at least portion of the upper surface of the low friction insert.

19. A system, comprising:
a monitor; and
a monitor stand for holding the monitor and maintaining a position of the monitor according to claim 17.

20. The system according to claim 19, wherein
the monitor is selected from the group consisting of: a display monitor, and a personal computer all-in-one device.

21. The monitor stand according to claim 1, wherein
the carrier is adapted to removably and fixedly hold a display monitor.

22. The monitor stand according to claim 1, wherein
the carrier is adapted to removably and fixedly hold a personal computer all-in-one device.

23. The monitor stand according to claim 14, wherein
the carrier is adapted to removably and fixedly hold a display monitor.

24. The monitor stand according to claim 14, wherein
the carrier is adapted to removably and fixedly hold a personal computer all-in-one device.

25. The monitor stand according to claim 17, wherein
the carrier is adapted to removably and fixedly hold a display monitor.

26. The monitor stand according to claim 17, wherein
the carrier is adapted to removably and fixedly hold a personal computer all-in-one device.

* * * * *